United States Patent
Olsen et al.

(10) Patent No.: US 12,427,756 B2
(45) Date of Patent: Sep. 30, 2025

(54) MULTILAYER HEAT-SHRINKABLE BARRIER FILM AND PACKAGES MADE THEREFROM

(71) Applicant: Cryovac, LLC, Charlotte, NC (US)

(72) Inventors: Jessica Ashley Olsen, Charlotte, NC (US); Silvia Bottini, Lissone (IT); Ashley Cornell Wynne, Woodruff, SC (US); Robert Babrowicz, Tega Cay, SC (US); Dwight Wayne Schwark, Rock Hill, SC (US); Sri Charan Yarlagadda, Charlotte, NC (US); Miles Andrew Johnston, Tega Cay, SC (US)

(73) Assignee: Cryovac, LLC, Charlotte, NC (US)

( * ) Notice: Subject to any disclaimer, the term of this patent is extended or adjusted under 35 U.S.C. 154(b) by 225 days.

(21) Appl. No.: 18/031,085

(22) PCT Filed: Oct. 18, 2021

(86) PCT No.: PCT/US2021/055369
§ 371 (c)(1),
(2) Date: Apr. 10, 2023

(87) PCT Pub. No.: WO2022/082090
PCT Pub. Date: Apr. 21, 2022

(65) Prior Publication Data
US 2023/0373198 A1     Nov. 23, 2023

Related U.S. Application Data

(60) Provisional application No. 63/092,632, filed on Oct. 16, 2020.

(51) Int. Cl.
B32B 27/08     (2006.01)
B32B 7/12      (2006.01)
(Continued)

(52) U.S. Cl.
CPC .............. *B32B 27/08* (2013.01); *B32B 7/12* (2013.01); *B32B 27/16* (2013.01); *B32B 27/304* (2013.01);
(Continued)

(58) Field of Classification Search
None
See application file for complete search history.

(56) References Cited

U.S. PATENT DOCUMENTS 4,610,914 A    9/1986  Newsome
4,726,984 A    2/1988  Shah
(Continued)

FOREIGN PATENT DOCUMENTS

EP    2805821 A1    11/2014
JP    2710844 B2     2/1998
WO    2021117052     6/2021

OTHER PUBLICATIONS

Miller, How Do Vertical Form Fill Packaging Machines Work, Viking Masek. (Year: 2020).*

*Primary Examiner* — Ramsey Zacharia
(74) *Attorney, Agent, or Firm* — Jason R. Womer

(57) ABSTRACT

A multilayer shrink film having at least two barrier layers. The barrier layers including ethylene-vinyl alcohol copolymer with an ethylene content of between 27-50 mol %. The multilayer shrink film having a free shrink of at least 60%, 65% and 70% at 85 #C measured in accordance with ASTM D2732. The multilayer shrink film having an oxygen transmission rate of no more than: 5, 10, 15, or 20 cubic centimeters (at standard temperature and pressure) per square meter per day per 1 atmosphere of oxygen pressure differential measured at 0% relative humidity and 23 #C measured according to ASTM D-3985. The multilayer
(Continued)

shrink film having a haze after shrink of less than 50 measured in accordance with ASTM D 1003.

20 Claims, 4 Drawing Sheets

(51) Int. Cl.
  *B32B 27/16*   (2006.01)
  *B32B 27/30*   (2006.01)
  *B32B 27/32*   (2006.01)
  *B32B 27/36*   (2006.01)
  *B65D 65/40*   (2006.01)
  *B65D 75/00*   (2006.01)

(52) U.S. Cl.
  CPC ......... *B32B 27/306* (2013.01); *B32B 27/308* (2013.01); *B32B 27/32* (2013.01); *B32B 27/36* (2013.01); *B65D 65/40* (2013.01); *B65D 75/002* (2013.01); B32B 2250/05 (2013.01); B32B 2250/24 (2013.01); B32B 2270/00 (2013.01); B32B 2307/31 (2013.01); B32B 2307/406 (2013.01); B32B 2307/414 (2013.01); B32B 2307/54 (2013.01); B32B 2307/558 (2013.01); B32B 2307/5825 (2013.01); B32B 2307/7244 (2013.01); B32B 2307/736 (2013.01); B32B 2439/46 (2013.01); B32B 2439/70 (2013.01)

(56) References Cited

U.S. PATENT DOCUMENTS

| | | | |
|---|---|---|---|
| 4,841,605 A | | 6/1989 | Schuierer |
| 5,152,946 A | | 10/1992 | Gillette |
| 5,346,735 A | | 9/1994 | Logan et al. |
| 5,374,459 A | | 12/1994 | Mumpower et al. |
| 5,571,864 A | * | 11/1996 | Bates ............... C08L 25/06 525/88 |
| 5,667,902 A | | 9/1997 | Brew et al. |
| 5,876,857 A | | 3/1999 | Schuhmann et al. |
| 6,214,392 B1 | | 4/2001 | Ramirez |
| 6,291,063 B1 | | 9/2001 | Shah et al. |
| 6,551,674 B2 | | 4/2003 | Piper et al. |
| 6,602,455 B1 | | 8/2003 | Forloni |
| 6,787,220 B2 | | 9/2004 | Wallace et al. |
| 6,824,878 B2 | | 11/2004 | Migliorini et al. |
| 6,924,041 B2 | | 8/2005 | Lee et al. |
| 7,018,719 B2 | | 3/2006 | Ueyama et al. |
| 7,517,569 B2 | | 4/2009 | Kreitman et al. |
| 8,075,964 B2 | | 12/2011 | Mueller et al. |
| 8,377,529 B2 | | 2/2013 | Bekele |
| 8,435,642 B2 | | 5/2013 | Bekele |
| 8,657,495 B2 | | 2/2014 | Maxwell et al. |
| 9,005,514 B2 | | 4/2015 | Bekele |
| 9,783,352 B2 | | 10/2017 | Hausmann et al. |
| 10,421,258 B2 | | 9/2019 | Lee et al. |
| 10,676,605 B2 | | 6/2020 | Sato et al. |
| 10,703,887 B2 | | 7/2020 | Komuro et al. |
| 2003/0157354 A1 | | 8/2003 | Van Veghel et al. |
| 2007/0172614 A1 | | 7/2007 | Lee |
| 2009/0208717 A1 | | 8/2009 | Enzinger et al. |
| 2013/0196166 A1 | | 8/2013 | Lu |
| 2014/0099490 A1 | | 4/2014 | Kitano et al. |
| 2014/0314920 A1 | | 10/2014 | Beckwith et al. |
| 2015/0104627 A1 | | 4/2015 | O'Donnell et al. |
| 2016/0185085 A1 | | 6/2016 | Spigaroli |
| 2016/0207275 A1 | | 7/2016 | Schiffmann |
| 2019/0202181 A1 | | 7/2019 | Hirose et al. |
| 2020/0048387 A1 | | 2/2020 | Takeshita et al. |
| 2020/0079940 A1 | | 3/2020 | Usui et al. |
| 2020/0087504 A1 | | 3/2020 | Usui et al. |
| 2020/0095396 A1 | | 3/2020 | Komuro et al. |
| 2020/0115522 A1 | | 4/2020 | Usui et al. |
| 2020/0123372 A1 | | 4/2020 | Takeshita et al. |
| 2020/0207945 A1 | | 7/2020 | Usui et al. |
| 2020/0216655 A1 | | 7/2020 | Usui et al. |
| 2020/0224018 A1 | | 7/2020 | Usui et al. |
| 2020/0255647 A1 | | 8/2020 | Usui et al. |
| 2020/0263010 A1 | | 8/2020 | Usui et al. |
| 2020/0269558 A1 | | 8/2020 | Usui et al. |
| 2020/0270440 A1 | | 8/2020 | Usui et al. |

* cited by examiner

MULTILAYER HEAT-SHRINKABLE BARRIER FILM AND PACKAGES MADE THEREFROM

CROSS-REFERENCE TO RELATED APPLICATIONS

This application claims priority to U.S. Provisional Patent Application Ser. No. 62/092,632, filed Oct. 16, 2020 and entitled "Multilayer Heat-Shrinkable Barrier Film and Packages Made Therefrom," the entirety of which is incorporated herein by reference.

BACKGROUND

The subject matter disclosed herein relates to heat shrinkable thermoplastic films, and more particularly to heat shrinkable barrier films and methods of packaging products in heat shrinkable thermoplastic film.

Multilayer, thermoplastic films are being used for packaging various food and non-food products because they protect the item itself from the environment during storage and distribution. Furthermore, for the end consumer, it is desirable to present the product packaged in a preferably transparent thermoplastic film that allows visible inspection of the package contents to help assure the quality of the product. Optical characteristics are therefore often important for a thermoplastic film for packaging.

Other properties of the film, such as good processability, mechanical and shrink properties are desired for the manufacture of films and packaging of products.

For certain food packaging, it is necessary that the film have good oxygen barrier characteristics to delay or avoid product oxidation or degradation during its shelf-life.

However, changing film formulations to improve one film property often has detrimental effect on other film properties. For example, an attribute of a film that may contribute to good mechanical properties may also result in undesirably reduced free shrink and appearance characteristics (e.g., gloss, haze, and total transmission) of the film. Therefore, it is difficult to formulate a multilayer film that balances all processing, mechanical and optical properties of a film.

Furthermore, changing film formulations may create challenges for being able to recycle multilayer films in traditional recycle streams.

Therefore, a film with good optical, mechanical, processability, barrier and shrinkability properties is desired. A film can that can be recycled in polyethylene recycle streams is desired.

The discussion above is merely provided for general background information and is not intended to be used as an aid in determining the scope of the claimed subject matter.

BRIEF DESCRIPTION

A multilayer shrink film having at least two barrier layers. The barrier layers including ethylene-vinyl alcohol copolymer with an ethylene content of between 27-50 mol %. The multilayer shrink film having a free shrink of at least 60%, 65% and 70% at 85° C. measured in accordance with ASTM D2732. The multilayer shrink film having an oxygen transmission rate of no more than: 5, 10, 15, or 20 cubic centimeters (at standard temperature and pressure) per square meter per day per 1 atmosphere of oxygen pressure differential measured at 0% relative humidity and 23° C. measured according to ASTM D-3985. The multilayer shrink film having a haze after shrink of less than 50 measured in accordance with ASTM D 1003.

An advantage that may be realized in the practice of some disclosed embodiments of the multilayer shrink film is a film having good shrink, processability, barrier properties and optical qualities.

In one exemplary embodiment, a multilayer shrink film is disclosed. The multilayer shrink film comprises a) a first outer layer being a sealant layer; b) a first barrier layer comprising an ethylene-vinyl alcohol copolymer with an ethylene content of between 27-50 mol %; c) a second barrier layer comprising an ethylene-vinyl alcohol copolymer with an ethylene content of between 27-50 mol %; d) a first tie layer disposed between the first and second barrier layers and directly adhered to at least one of the first or second barrier layer, the tie layer comprising at least one component selected from anhydride modified grafted linear low density polyethylene, anhydride grafted low density polyethylene, anhydride grafted polypropylene, anhydride grafted methyl acrylate copolymer, anhydride grafted butyl acrylate copolymer, homogeneous ethylene/alpha-olefin copolymer, and anhydride grafted ethylene/vinyl acetate copolymer; and e) a second outer layer being a skin layer. The multilayer shrink film having a free shrink of at least 60%, 65% and 70% at 85° C. measured in accordance with ASTM D2732 an oxygen transmission rate of no more than: 5, 10, 15, or 20 cubic centimeters (at standard temperature and pressure) per square meter per day per 1 atmosphere of oxygen pressure differential measured at 0% relative humidity and 23° C. measured according to ASTM D-3985 and a haze after shrink of less than 50 measured in accordance with ASTM D 1003.

In another exemplary embodiment, a packaged product is disclosed. The packaged product having a multilayer shrink film and a product. The multilayer shrink film comprises a) a first outer layer being a sealant layer; b) a first barrier layer comprising an ethylene-vinyl alcohol copolymer with an ethylene content of between 27-50 mol %; c) a second barrier layer comprising an ethylene-vinyl alcohol copolymer with an ethylene content of between 27-50 mol %; d) a first tie layer disposed between the first and second barrier layers and directly adhered to at least one of the first or second barrier layer, the tie layer comprising at least one component selected from anhydride modified grafted linear low density polyethylene, anhydride grafted low density polyethylene, anhydride grafted polypropylene, anhydride grafted methyl acrylate copolymer, anhydride grafted butyl acrylate copolymer, homogeneous ethylene/alpha-olefin copolymer, and anhydride grafted ethylene/vinyl acetate copolymer; and e) a second outer layer being a skin layer. The multilayer shrink film having a free shrink of at least 60%, 65% and 70% at 85° C. measured in accordance with ASTM D2732 an oxygen transmission rate of no more than: 5, 10, 15, or 20 cubic centimeters (at standard temperature and pressure) per square meter per day per 1 atmosphere of oxygen pressure differential measured at 0% relative humidity and 23° C. measured according to ASTM D-3985 and a haze after shrink of less than 50 measured in accordance with ASTM D 1003.

In another exemplary embodiment, a method of making a multilayer shrink film is disclosed. The method comprises the steps of coextruding a multilayer shrink film comprises a) a first outer layer being a sealant layer; b) a first barrier layer comprising an ethylene-vinyl alcohol copolymer with an ethylene content of between 27-50 mol %; c) a second barrier layer comprising an ethylene-vinyl alcohol copolymer with an ethylene content of between 27-50 mol %; d) a first tie layer disposed between the first and second barrier layers and directly adhered to at least one of the first or second barrier layer, the tie layer comprising at least one component selected from anhydride modified grafted linear low density polyethylene, anhydride grafted low density polyethylene, anhydride grafted polypropylene, anhydride grafted methyl acrylate copolymer, anhydride grafted butyl acrylate copolymer, homogeneous ethylene/alpha-olefin copolymer, and anhydride grafted ethylene/vinyl acetate copolymer; and e) a second outer layer being a skin layer. The multilayer shrink film having a free shrink of at least 60%, 65% and 70% at 85° C. measured in accordance with ASTM D2732 an oxygen transmission rate of no more than: 5, 10, 15, or 20 cubic centimeters (at standard temperature and pressure) per square meter per day per 1 atmosphere of oxygen pressure differential measured at 0% relative humidity and 23° C. measured according to ASTM D-3985 and a haze after shrink of less than 50 measured in accordance with ASTM D 1003.

This brief description of the invention is intended only to provide a brief overview of subject matter disclosed herein according to one or more illustrative embodiments, and does not serve as a guide to interpreting the claims or to define or limit the scope of the invention, which is defined only by the appended claims. This brief description is provided to introduce an illustrative selection of concepts in a simplified form that are further described below in the detailed description. This brief description is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

So that the manner in which the features of the invention can be understood, a detailed description of the invention may be had by reference to certain embodiments, some of which are illustrated in the accompanying drawings. It is to be noted, however, that the drawings illustrate only certain embodiments of this invention and are therefore not to be considered limiting of its scope, for the scope of the invention encompasses other equally effective embodiments. The drawings are not necessarily to scale, emphasis generally being placed upon illustrating the features of certain embodiments of the invention. In the drawings, like numerals are used to indicate like parts throughout the various views. Thus, for further understanding of the invention, reference can be made to the following detailed description, read in connection with the drawings in which.

DETAILED DESCRIPTION

Figure 1:
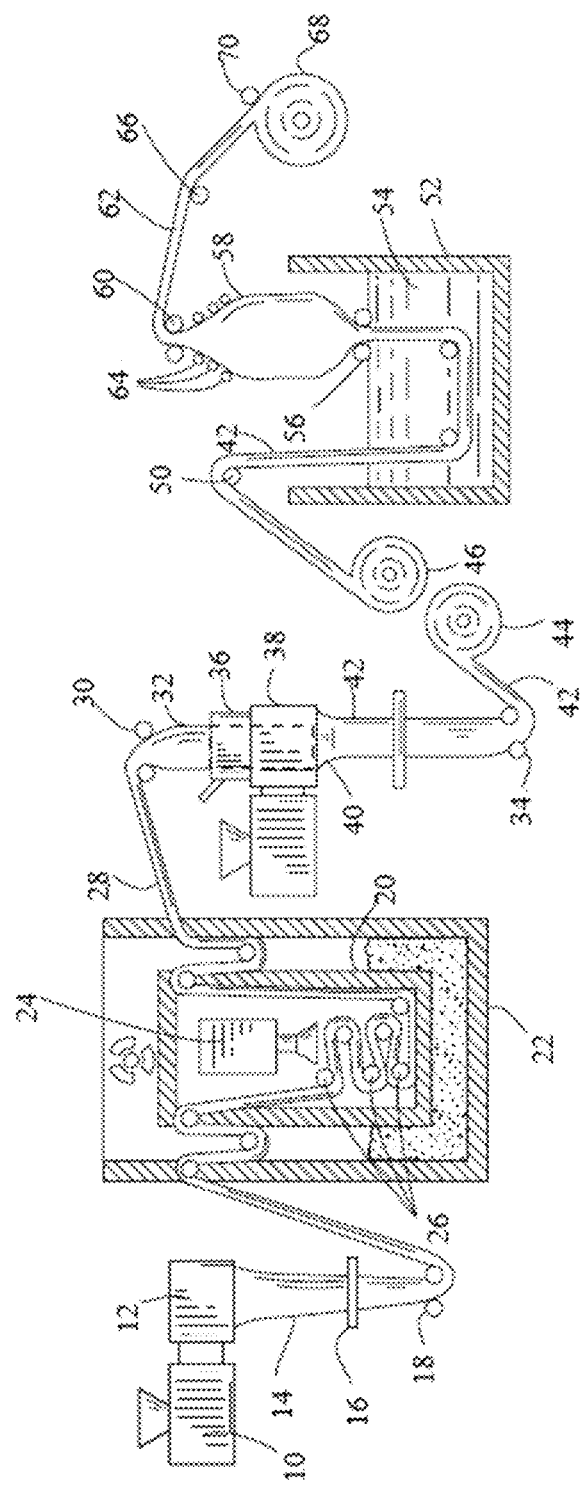
FIG. 1 is a schematic of a process for making a heat-shrinkable film in accordance with an embodiment.

As used herein, the term "film" is inclusive of plastic web, regardless of whether it is film or sheet. The film can have a thickness of 0.25 mm or less, or a thickness of from 0.5 to 30 mils, or from 0.5 to 15 mils, or from 1 to 10 mils, or from 1 to 8 mils, or from 1.1 to 7 mils, or from 1.2 to 6 mils, or from 1.3 to 5 mils, or from 1.5 to 4 mils, or from 1.6 to 3.5 mils, or from 1.8 to 3.3 mils, or from 2 to 3 mils, or from 1.5 to 4 mils, or from 0.5 to 1.5 mils, or from 1 to 1.5 mils, or from 0.7 to 1.3 mils, or from 0.8 to 1.2 mils, or from 0.9 to 1.1 mils.

The multi-layer films described herein may comprise at least, and/or at most, any of the following numbers of layers 5, 6, 7, 8, 9, 10, 11, 12, 13, 14 and 15. As used herein, the term "layer" refers to a discrete film component which is substantially coextensive with the film and has a substantially uniform composition. Where two or more directly adjacent layers have essentially the same composition, then these two or more adjacent layers may be considered a single layer for the purposes of this application. In an embodiment, the multilayer film utilizes microlayers. A microlayer section may include between 10 and 1,000 microlayers in each microlayer section.

The multi-layer films described herein include at least two barrier layers to restrict gas from permeating through the film. The films may further include additional layers, for example to add bulk, provide functionality, abuse resistance, printing capability or to act as a tie layer.

Below are some examples of combinations in which the alphabetical symbols designate the film layers. Where the multilayer film representation below includes the same letter more than once, each occurrence of the letter may represent the same composition or a different composition within the class that performs a similar function.

A/C/B/C/B/C/A, A/D/B/C/B/C/A, A/D/B/C/B/D/A, A/C/D/B/C/B/C/A, A/D/C/B/C/B/C/A, A/C/D/B/C/B/D/A, A/D/C/B/C/B/D/A, A/C/B/C/D/B/C/A, A/D/B/C/D/B/C/A, A/C/B/C/D/B/D/A, A/C/B/C/D/B/C/D/A, A/C/B/C/D/B/D/C/A, A/C/D/B/C/D/B/C/A, A/D/C/B/C/D/B/D/A, A/C/B/C/D/C/B/C/A, A/D/C/B/C/D/C/B/C/A, A/D/C/B/C/D/C/B/C/D/A, A/C/D/C/B/C/D/C/B/C/D/C/A, A/C/D/C/B/C/D/C/B/C/D/C/A.

"A" represents an outer layer, as discussed herein.

"B" represents a barrier layer, as discussed herein.

"C" represents an intermediate layer (e.g., a tie layer), as discussed herein.

"D" represents one or more other layers of the film, such as a bulk layer.

All compositional percentages used herein are presented on a "by weight" basis, unless designated otherwise.

Outer Film Layers

The outer layers of the films described herein are a sealant layer and a skin layer. The first outer layer being the sealant layer and the second outer layer being the skin layer. As used herein, the phrases "seal layer", "sealing layer", "heat seal layer", and "sealant layer", refer to an outer layer, or layers, involved in the sealing of the film to itself, another layer of the same or another film, and/or another article which is not a film. As used herein, the phrase "skin layer" refers to a film layer having only one of its surfaces directly adhered to another layer of the film and its other surface is exposed to the environment. The primary function of the skin layer is to provide puncture, abuse, thermal and abrasion resistance.

As used herein, the term "heat-seal," and the phrase "heat-sealing," refer to any seal of a first region of a film surface to a second region of a film surface, wherein the seal is formed by heating the regions to at least their respective seal initiation temperatures. Heat-sealing is the process of joining two or more thermoplastic films or sheets by heating areas in contact with each other to the temperature at which fusion occurs, usually aided by pressure. The heating can be performed by any one or more of a wide variety of manners, such as using a heated bar, hot wire, hot air, infrared radiation, ultraviolet radiation, electron beam, ultrasonic, and melt-bead. A heat seal is usually a relatively narrow seal (e.g., 0.02 inch to 1 inch wide) across a film. One particular heat sealing means is a heat seal made using an impulse sealer, which uses a combination of heat and pressure to form the seal, with the heating means providing a brief pulse of heat while pressure is being applied to the film by a seal bar or seal wire, followed by rapid cooling of the bar or wire.

Heat seal layers include thermoplastic polymers such as thermoplastic polyolefins and ionomers. In embodiments, polymers for the sealant layer include homogeneous ethylene/alpha-olefin copolymer, heterogeneous ethylene/alpha-olefin copolymer, ethylene homopolymer, ionomer and ethylene/vinyl acetate copolymer. In some embodiments, the heat seal layer can comprise a polyolefin, particularly an ethylene/alpha-olefin copolymer. For example, a polyolefin having a density of from 0.88 g/cc to 0.917 g/cc, or from 0.90 g/cc to 0.917 g/cc, or less than 0.92 g/cc. More particularly, the seal layer can comprise at least one member selected from the group consisting of high density polyethylene, linear low density polyethylene, medium density polyethylene, low density polyethylene, very low density polyethylene, homogeneous ethylene/alpha-olefin copolymer, and polypropylene. "Polymer" herein refers to homopolymer, copolymer, terpolymer, etc. "Copolymer" herein includes copolymer, terpolymer, etc.

As used herein, the term "copolymer" refers to polymers formed by the polymerization of reaction of at least two different monomers. For example, the term "copolymer" includes the co-polymerization reaction product of ethylene and an olefin, such as 1-octene. The term "copolymer" is also inclusive of, for example, the co-polymerization of a mixture of ethylene, propylene, 1-propene, 1-butene, 1-hexene, and 1-octene. As used herein, a copolymer identified in terms of a plurality of monomers, e.g., "propylene/ethylene copolymer," refers to a copolymer in which either a monomer may copolymerize in a higher weight or molar percent than the other monomer or monomers. However, the first listed monomer generally polymerizes in a higher weight percent than the second listed monomer.

"High density polyethylene" (HDPE) as used herein has a density of at least 0.950 grams per cubic centimeter.

"Medium density polyethylene" (MDPE) as used herein has a density in the range of from 0.930 to 0.950 grams per cubic centimeter.

"Low density polyethylene" (LDPE) as used herein has a density in the range of from 0.910 to 0.930 grams per cubic centimeter.

"Linear low density polyethylene" (LLDPE) as used herein has a density in the range of from 0.910 to 0.930 grams per cubic centimeter.

"Very low density polyethylene" (VLDPE) as used herein has a density less than 0.915 grams per cubic centimeter.

Unless otherwise indicated, all densities herein are measured according to ASTM D-1505.

As used herein, the term "polyolefin" refers to any polymerized olefin, which can be linear, branched, cyclic, aliphatic, substituted, or unsubstituted. More specifically, included in the term polyolefin are homopolymers of olefin, copolymers of olefin, copolymers of an olefin and an non-olefinic comonomer copolymerizable with the olefin, such as unsaturated ester, unsaturated acid (especially alpha-beta monocarboxylic acids), unsaturated acid anhydride, unsaturated acid metal neutralized salts, and the like. Specific examples include polyethylene homopolymer, polypropylene homopolymer, polybutene, ethylene/alpha-olefin copolymer, propylene/alpha-olefin copolymer, butene/alpha-olefin copolymer, ethylene/vinyl acetate copolymer, ethylene/ethyl acrylate copolymer, ethylene/butyl acrylate copolymer, ethylene/methyl acrylate copolymer, ethylene/acrylic acid copolymer, ethylene/methacrylic acid copolymer, modified polyolefin resin, ionomer resin, polymethylpentene, etc. Modified polyolefin resin is inclusive of modified polymer prepared by copolymerizing the homopolymer of the olefin or copolymer thereof with an unsaturated carboxylic acid, e.g., maleic acid, fumaric acid or the like, or a derivative thereof such as the anhydride, ester or metal salt or the like. It could also be obtained by incorporating into the olefin homopolymer or copolymer, an unsaturated carboxylic acid, e.g., maleic acid, fumaric acid or the like, or a derivative thereof such as the anhydride, ester or metal salt or the like.

As used herein, the phrase "modified polymer," as well as more specific phrases such as "modified ethylene vinyl acetate copolymer," and "modified polyolefin" refer to such polymers having an anhydride functionality, as defined immediately above, grafted thereon and/or copolymerized therewith and/or blended therewith. Preferably, such modified polymers have the anhydride functionality grafted on or polymerized therewith, as opposed to merely blended therewith.

In general, the ethylene/alpha-olefin copolymer comprises a copolymer resulting from the copolymerization of from about 80 to 99 weight percent ethylene and from 1 to 20 weight percent alpha-olefin. Preferably, the ethylene alpha-olefin copolymer comprises a copolymer resulting from the copolymerization of from about 85 to 95 weight percent ethylene and from 5 to 15 weight percent alpha-olefin.

As used herein, the phrase "heterogeneous polymer" refers to polymerization reaction products of relatively wide variation in molecular weight and relatively wide variation in composition distribution, i.e., typical polymers prepared, for example, using conventional Ziegler-Natta catalysts. Heterogeneous copolymers typically contain a relatively wide variety of chain lengths and comonomer percentages. Heterogeneous copolymers have a molecular weight distribution (Mw/Mn) of greater than 3.0.

As used herein, the phrase "homogeneous polymer" refers to polymerization reaction products of relatively narrow molecular weight distribution and relatively narrow composition distribution. Homogeneous polymers are useful in various layers of the multilayer heat-shrinkable film. Homogeneous polymers are structurally different from heterogeneous polymers, in that homogeneous polymers exhibit a relatively even sequencing of comonomers within a chain, a mirroring of sequence distribution in all chains, and a similarity of length of all chains, i.e., a narrower molecular weight distribution. Furthermore, homogeneous polymers are typically prepared using metallocene, or other single-site type catalysis, rather than using Ziegler Natta catalysts. Homogeneous polymers have a molecular weight distribution (Mw/Mn) of less than 3.0 More particularly, homogeneous ethylene/alpha-olefin copolymers may be characterized by one or more methods known to those of skill in the art, such as molecular weight distribution ($M_w/M_n$), composition distribution breadth index (CDBI), narrow melting point range, and single melt point behavior. The molecular weight distribution ($M_w/M_n$), also known as "polydispersity," may be determined by gel permeation chromatography. In some embodiments, the homogeneous ethylene/alpha-olefin copolymers have an $M_w/M_n$ of less than 2.7; in another embodiment from about 1.9 to 2.5; and it yet another embodiment, from about 1.9 to 2.3. The composition distribution breadth index (CDBI) of such homogeneous ethylene/alpha-olefin copolymers will generally be greater than about 70 percent. The CDBI is defined as the weight percent of the copolymer molecules having a comonomer content within 50 percent (i.e., plus or minus 50%) of the median total molar comonomer content. The CDBI of linear polyethylene, which does not contain a comonomer, is defined to be 100%. The Composition Distribution Breadth Index (CDBI) is determined via the technique of Temperature Rising Elution Fractionation (TREF). CDBI determination clearly distinguishes homogeneous copolymers (i.e., narrow composition distribution as assessed by CDBI values generally above 70%) from VLDPEs available commercially which generally have a broad composition distribution as assessed by CDBI values generally less than 55%. TREF data and calculations therefrom for determination of CDBI of a copolymer is readily calculated from data obtained from techniques known in the art, such as, for example, temperature rising elution fractionation as described, for example, in Wild et. al., *J. Poly. Sci. Poly. Phys. Ed.*, Vol. 20, p. 441 (1982). In some embodiments, homogeneous ethylene/alpha-olefin copolymers have a CDBI greater than about 70%, i.e., a CDBI of from about 70% to 99%. In general, homogeneous ethylene/alpha-olefin copolymers useful in the present invention also exhibit a relatively narrow melting point range, in comparison with "heterogeneous copolymers", i.e., polymers having a CDBI of less than 55%. In an embodiment, the homogeneous ethylene/alpha-olefin copolymers exhibit an essentially singular melting point characteristic, with a peak melting point ($T_m$), as determined by Differential Scanning Colorimetry (DSC), of from about 60° C. to 105° C. In an embodiment, the homogeneous copolymer has a DSC peak $T_m$ of from about 80° C. to 100° C. As used herein, the phrase "essentially single melting point" means that at least about 80%, by weight, of the material corresponds to a single $T_m$ peak at a temperature within the range of from about 60° C. to 105° C., and essentially no substantial fraction of the material has a peak melting point in excess of about 115° C., as determined by DSC analysis. DSC measurements are made on a Perkin Elmer System 7 Thermal Analysis System. Melting information reported are second melting data, i.e., the sample is heated at a programmed rate of 10° C./min to a temperature below its critical range. The sample is then reheated (2nd melting) at a programmed rate of 10° C./min.

A homogeneous ethylene/alpha-olefin copolymer can, in general, be prepared by the copolymerization of ethylene and any one or more alpha-olefin. In certain embodiments, the alpha-olefin is a $C_3$-$C_{20}$ alpha-monoolefin, a $C_4$-$C_{12}$ alpha-monoolefin, a $C_4$-$C_8$ alpha-monoolefin. In an embodiment, the alpha-olefin copolymer comprises at least one member selected from the group consisting of butene-1, hexene-1, and octene-1, i.e., 1-butene, 1-hexene, and 1-octene, respectively. In an embodiment, the alpha-olefin copolymer comprises octene-1, and/or a blend of hexene-1 and butene-1. In another embodiment, the alpha-olefin copolymer comprises a blend of at least two of octene-1, hexene-1 and butene-1.

In an embodiment, the heat seal layer is mainly composed of polyolefin. In an embodiment, the heat seal layer has a total polyolefin content of from 90 to 99 wt % based on the total composition of the heat seal layer. In other embodiments, the heat seal layer is composed solely of polyolefin(s).

In an embodiment, the heat seal layer has a melting point less than any of the following values: 220° C., 210° C., 200° C., 190° C., 180° C., 170° C., 160° C., 150° C., 140° C. and 130° C.; and the melting point of the heat seal layer may be at least any of the following values: 90° C., 100° C., 110° C., 120° C., 130° C., 140° C., and 150° C. In an embodiment, the heat seal layer comprises from 80 to 99 wt % of a linear low density polyethylene copolymer having a melting point between 90-130° C. In an embodiment, the heat seal layer comprises from 80 to 99 wt % of a very low density polyethylene copolymer having a melting point between 85-125° C. All references to the melting point of a polymer, a resin, or a film layer in this application refer to the melting peak temperature of the dominant melting phase of the polymer, resin, or layer as determined by differential scanning calorimetry according to ASTM D-3418.

In embodiments where the heat seal layer comprises amorphous material, then the heat seal layer may not clearly display a melting point. The glass transition temperature for the heat seal layer may be less than, and may range between, any of the following values: 125° C., 120° C., 110° C., 100° C., 90° C., 80° C., 70° C., 60° C., and 50° C.; measured where the relative humidity may be any of the following values: 100%, 75%, 50%, 25%, and 0%. All references to the glass transition temperature ($T_g$) of a polymer was determined by the Perkin Elmer "half Cp extrapolated" (the "half Cp extrapolated" reports the point on the curve where the specific heat change is half of the change in the complete transition) following the ASTM D3418 "Standard Test Method of Transition Temperatures of Polymers by Thermal Analysis," which is hereby incorporated, in its entirety, by reference thereto.

In an embodiment the heat seal layer has a melt index or composite melt index of at least 0.5, 1.0, 1.5, 2.0, 2.5, 3.0, 3.5, 4.0, 4.5 and 5.0 g/10 min @190° C. and 2.16 kg measured in accordance with ASTM D1238.

The thickness of the heat seal layer may be selected to provide sufficient material to cause a strong heat seal bond, yet not so thick so as to negatively affect the characteristics of the film to an unacceptable level. The heat seal layer may have a thickness of at least any of the following values: 0.05 mils, 0.1 mils, 0.15 mils, 0.2 mils, 0.25 mils, 0.3 mils, 0.35 mils, 0.4 mils, 0.45 mils, 0.5 mils, and 0.6 mils. The heat seal layer may have a thickness less than any of the following values: 5 mils, 4 mils, 3 mils, 2 mils, 1 mil, 0.7 mils, 0.5 mils, and 0.3 mils. The thickness of the heat seal layer as a percentage of the total thickness of the film may be less that any of the following values: 50%, 40%, 30%, 25%, 20%, 15%, 10%, and 5%; and may range between any of the forgoing values (e.g., from 10% to 30%).

The skin layer is film layer having only one of its surfaces directly adhered to another layer of the film and its other surface is exposed to the environment. The primary function of the skin layer is to provide puncture, abuse, thermal and abrasion resistance.

As used herein, the phrase "directly adhered," as applied to film layers, is defined as adhesion of the subject film layer to the object film layer, without a tie layer, adhesive, or other layer therebetween. In contrast, as used herein, the word "between," as applied to a film layer expressed as being between two other specified layers, includes both direct adherence of the subject layer between to the two other layers it is between, as well as including a lack of direct adherence to either or both of the two other layers the subject layer is between, i.e., one or more additional layers can be imposed between the subject layer and one or more of the layers the subject layer is between.

The thickness of the skin layer may be selected to provide sufficient abuse resistance. The skin layer may have a thickness of at least any of the following values: 0.05 mils, 0.1 mils, 0.15 mils, 0.2 mils, 0.25 mils, 0.3 mils, 0.35 mils, 0.4 mils, 0.45 mils, 0.5 mils, and 0.6 mils. The skin layer may have a thickness less than any of the following values: 5 mils, 4 mils, 3 mils, 2 mils, 1 mil, 0.7 mils, 0.5 mils, and 0.3 mils. The thickness of skin layer as a percentage of the total thickness of the film may be less that any of the following values: 50%, 40%, 30%, 25%, 20%, 15%, 10%, and 5%; and may range between any of the forgoing values (e.g., from 10% to 30%).

In embodiments, the skin layer comprises polyolefin, polypropylene copolymer, polyolefin block copolymer or blends thereof. In some embodiments, the skin layer is predominately polypropylene copolymer. In embodiments, the skin layer includes at least 60 wt %, 65 wt %, 70 wt %, 75 wt %, 80 wt %, 85 wt %, 90 wt %, 95 wt % or substantially all polypropylene copolymer. In embodiments the skin layer includes at least 40 wt %, 45 wt %, 50 wt %, 55 wt % 60 wt %, 65 wt %, 70 wt %, 75 wt %, 80 wt %, 85 wt %, 90 wt %, 95 wt % or substantially all LLDPE, VLDPE, or blends thereof Tie Layer The film may comprise one or more intermediate layers, such as a tie layer. In addition to a first intermediate layer, the film may comprise a second intermediate layer. "Intermediate" herein refers to a layer of a multi-layer film which is between an outer layer and an inner layer of the film. "Inner layer" herein refers to a layer which is not an outer or surface layer, and has both of its principal surfaces directly adhered to another layer of the film. "Outer layer" herein refers to any film layer of film having less than two of its principal surfaces directly adhered to another layer of the film. All multilayer films have two, and only two, outer layers, each of which has a principal surface adhered to only one other layer of the multilayer film. In monolayer films, there is only one layer, which, of course, is an outer layer in that neither of its two principal surfaces are adhered to another layer of the film. "Outer layer" also is used with reference to the outermost layer of a plurality of concentrically arranged layers of a seamless tubing, or the outermost layer of a seamed film tubing.

In embodiments with multiple intermediate layers, the composition, thickness, and other characteristics of a second intermediate layer may be substantially the same as any of those of a first intermediate layer, or may differ from any of those of the first intermediate layer.

An intermediate layer may be, for example, between the heat seal layer and the barrier layer. An intermediate layer may be directly adjacent the heat seal layer, so that there is no intervening layer between the intermediate and heat seal layers. An intermediate layer may be directly adjacent the barrier layer, so that there is no intervening layer between the intermediate and barrier layers. An intermediate layer may be directly adjacent both the heat seal layer and the barrier layer.

An intermediate layer may have a thickness of at least about, and/or at most about, any of the following: 0.05, 0.1, 0.15, 0.2, 0.25, 0.5, 1, 2, 3, 4, and 5 mils. The thickness of the intermediate layer as a percentage of the total thickness of the film may be at least about, and/or at most about, any of the following: 1%, 3%, 5%, 7%, 10%, 15%, 20%, 25%, 30%, 35%, 40%, 45%, and 50%.

An intermediate layer may comprise one or more of any of the tie polymers described herein in at least about, and/or at most about, any of the following amounts: 10%, 20%, 30%, 40%, 50%, 60%, 70%, 75%, 80%, 90%, 95%, and 99.5%, by weight of the layer.

A tie layer refers to an internal film layer that adheres two layers to one another. Useful tie polymers include thermoplastic polymers that may be compatible both with the polymer of one directly adjacent layer and the polymer of the other directly adjacent layer. Such dual compatibility enhances the adhesion of the tied layers to each other. Tie layers can be made from polyolefins such as modified polyolefin, ethylene/vinyl acetate copolymer, modified ethylene/vinyl acetate copolymer, and homogeneous ethylene/alpha-olefin copolymer. Typical tie layer polyolefins include anhydride modified grafted linear low density polyethylene, anhydride grafted (i.e., anhydride modified) low density polyethylene, anhydride grafted very low density polyethylene, anhydride grafted polypropylene, anhydride grafted methyl acrylate copolymer, anhydride grafted butyl acrylate copolymer, homogeneous ethylene/alpha-olefin copolymer, and anhydride grafted ethylene/vinyl acetate copolymer.

Barrier Layers

The film comprises at least two barrier layers. As used herein, the term "barrier", and the phrase "barrier layer", as applied to films and/or film layers, are used with reference to the ability of a film or film layer to serve as a barrier to one or more gases. Oxygen transmission rate is one method to quantify the effect of a barrier layer. As used herein, the term "oxygen transmission rate" refers to the oxygen transmitted through a film in accordance with ASTM D3985 "Standard Test Method for Oxygen Gas Transmission Rate Through Plastic Film and Sheeting Using a Coulometric Sensor," which is hereby incorporated, in its entirety, by reference thereto.

The barrier layers include at least 50, 60, 70, 80, 90, or 95% weight of the layer of ethylene-vinyl alcohol copolymer or blends of ethylene-vinyl alcohol copolymers. In an embodiment the barrier layers are substantially all ethylene-vinyl alcohol copolymer. The ethylene content of the ethylene-vinyl alcohol copolymer has an effect on the processability of multilayer films and also has an effect on oxygen transmission rate. Generally, lower ethylene content results in a film that has a lower orientability, and may not be processable at certain orientation ratios. A higher ethylene content generally raises the oxygen transmission rate properties.

In other embodiments, the barrier layers are substantially all ethylene-vinyl alcohol copolymer or blends of ethylene-vinyl alcohol copolymers. Ethylene-vinyl alcohol copolymers may have an ethylene content of about 38 mole %, or at least about any of the following values: 20%, 25%, 30%, 38%, 44% and 48% all mole percent. In embodiments, ethylene-vinyl alcohol copolymers may have an ethylene content of at most about any of the following values: 50%, 48%, 44%, 40%, and 38% all mole percent. In embodiments, the ethylene-vinyl alcohol copolymer or blend of ethylene-vinyl alcohol copolymers resulting in an ethylene content of between 27-48 mol %. Ethylene-vinyl alcohol copolymers may include saponified or hydrolyzed ethylene/vinyl acetate copolymers, such as those having a degree of hydrolysis of at least about any of the following values: 50%, 85%, 95%, 95%. Ethylene-vinyl alcohol copolymers may have an ethylene content ranging from about 20 mole percent to about 50 mole percent. Exemplary ethylene-vinyl alcohol copolymers include those having ethylene contents of 27, 29, 32, 35, 38, 44, 48 and 50 mole % and blends thereof.

In embodiments the multilayer film includes at least two barrier layers of the same composition. In embodiments, the multilayer film includes at least two barrier layers of distinct compositions.

The composition, thickness, and other characteristics of a barrier layers may be substantially the same as any of those of other barrier layers, or may differ from any other barrier layers.

A barrier layers may have a thickness of at least about, and/or at most about, any of the following: 0.05, 0.1, 0.15, 0.2, 0.25, 0.5, 1, 2, 3, 4, and 5 mils. In embodiments the barrier layer is less than 15 wt % of the multilayer film. In other embodiments, the barrier layer is less than 10 wt % of the multilayer film. In yet other embodiments, the barrier layer is less than 5 wt % of the multilayer film.

Bulk Layer

The film may comprise one or more other layers such as a bulk layer. Bulk layers are often a layer or layers of a film that can increase the abuse resistance, toughness, or modulus of a film. In some embodiments the film comprises a bulk layer that functions to increase the abuse resistance, toughness, and/or modulus of the film. Bulk layers generally comprise polymers that are inexpensive relative to other polymers in the film that provide some specific purpose unrelated to abuse-resistance, modulus, etc. In an embodiment, the bulk layer comprises at least one member selected from the group consisting of: ethylene/alpha-olefin copolymer, ethylene homopolymer, propylene/alpha-olefin copolymer, propylene homopolymer, and combinations thereof.

The bulk layer may have a thickness of at least about, and/or at most about, any of the following: 0.05, 0.1, 0.15, 0.2, 0.25, 0.5, 1, 2, 3, 4, and 5 mils. The thickness of the bulk layer as a percentage of the total thickness of the film may be at least about, and/or at most about, any of the following: 1, 3, 5, 7, 10, 15, 20, 25, 30, 35, 40, 45, and 50 percent.

In embodiments, the bulk layer includes a blend of incompatible polymers. Blends of incompatible polymers can enhance the tear initiation, tear propagation, and linear tear properties of the film, including the ability to manually tear down the full length or across the full width of a package made from a packaging article comprising a multilayer packaging film, i.e., tearing through a seal and through and to an opposite edge of the package. For a package made from an end-seal bag, a machine-direction tear can be manually initiated in the bag skirt, and the machine-direction tear can be manually propagated through the seal and down the length of the bag, for a distance up to the full length of the package, i.e., to that portion of the package that corresponds with the opposite edge of the package after the packaging article is used to make the package. For a package made from a side-seal bag, the machine direction tear can be manually initiated in a bag skirt, and the machine direction tear can be manually propagated through the skirt and through the associated heat seal, with the tear thereafter being propagated in the machine direction, across the full width of the package, i.e., to that portion of the package that corresponds with the opposite edge of the side-seal bag after the bag is used to make the package.

In embodiments, the blend of incompatible polymers includes an ethylene/alpha-olefin copolymer, the ethylene/alpha-olefin copolymer can comprise at least one member selected from the group consisting of: (i) ethylene/hexene copolymer having a density of from about 0.90 g/cc to about 0.925 g/cc, and (ii) ethylene/octene copolymer having a density of from about 0.90 g/cc to about 0.925 g/cc. In other embodiments, the blend of incompatible polymers include the following: (i) a blend of 50 weight percent cyclic olefin copolymer with 50 weight percent propylene homopolymer; (ii) a blend of 70 wt. percent polystyrene with 30 wt. percent ethylene/vinyl acetate copolymer having a vinyl acetate content of 9 percent or 15 percent; (iii) a blend of 70 wt. percent very low density polyethylene and 30 wt. percent cyclic olefin copolymer; (iv) a blend of 70 weight percent ethylene/propylene copolymer and 30 weight percent homogeneous ethylene/alpha-olefin copolymer; (v) a blend of 70 weight percent ethylene/propylene copolymer and 30 wt. percent ethylene/vinyl acetate copolymer having a vinyl acetate content of 9 percent or 15 percent; (vi) a blend of 70 weight percent ethylene/propylene copolymer and 30 weight percent ethylene/methyl acrylate copolymer; (vii) a blend of 70 weight percent polystyrene with 30 weight percent amorphous nylon; (viii) a blend of 70 weight percent ionomer resin with 30 weight percent ethylene/vinyl acetate copolymer having a vinyl acetate content of 4 percent; (ix) a blend of 70 weight percent polyamide with 30 weight percent low density polyethylene; (x) a blend of 65 weight percent amorphous polyamide with 35% styrene/butadiene/styrene block copolymer.

As used herein, the phrase "incompatible polymers" refers to two polymers (i.e., a blend of at least two polymers) that are incapable of forming a solution or even a stable two-phase blend, and that tend to separate after being mixed. When blended, incompatible polymers are not miscible with one another, and phase separate into a continuous domain and a discontinuous domain that may be finely dispersed. The presence of one or more film layers having a blend of incompatible polymers may assist, enhance, or even cause the linear tear property of the multilayer heat-shrinkable film.

Multilayer Film

The layers described herein make up a multilayer film. The multilayer film having the desired properties. The barrier layers impart barrier properties into the multilayer film. In embodiments the multilayer film structure has an oxygen transmission rate of no more than: 5, 10, 15 or 20 cubic centimeters (at standard temperature and pressure) per square meter per day per 1 atmosphere of oxygen pressure differential measured at 0% relative humidity and 23° C. measured according to ASTM D-3985 which is hereby incorporated by reference in its entirety. Unless otherwise stated, OTR values provided herein are measured at 0% relative humidity and at a temperature of 23° C.

In embodiments, the multilayer film has an oxygen transmission rate of no more than: 10, 15, 20, 25, 30, 35, 40, 45, 50, 55, 60, 65 or 70 cubic centimeters (at standard temperature and pressure) per square meter per day per 1 atmosphere of oxygen pressure differential measured at 90% relative humidity and 23° C. measured according to ASTM D-3985 which is hereby incorporated by reference in its entirety. OTR measurements at 90% can in some situations better replicate real world results. In addition, films that exhibit good OTR values at 0% relative humidity may lose barrier properties at higher relative humidity.

Shrink feature can also be imparted to the multilayer film by orientation or stretching of the film, either mono-axially or biaxially, during film manufacture. This shrink feature allows the film to shrink or, if restrained, create shrink tension within the film upon exposure to heat. In a typical process, the thick structure which is extruded or coextruded through an extrusion die is quickly quenched, then it is heated to a suitable temperature, called the orientation temperature, which is higher than the glass transition temperature (Tg) of the resins used in the film itself but lower than the melting temperature (Tm) of at least one of the resins, and stretched in either or both of the machine (longitudinal) and transverse directions. As used herein, the phrase "machine direction" refers to a direction along the length of the film, i.e., in the direction of the film as the film is formed during extrusion and/or coating. As used herein, the phrase "transverse direction" refers to a direction across the film, perpendicular to the machine or longitudinal direction. The term "extrusion" is used with reference to the process of forming continuous shapes by forcing a molten plastic material through a die, followed by cooling or chemical hardening. Immediately prior to extrusion through the die, the relatively high-viscosity polymeric material is fed into a rotating screw of variable pitch, i.e., an extruder, which forces the polymeric material through the die. The term "coextrusion" refers to the process by which the outputs of two or more extruders are brought smoothly together in a feed block, to form a multilayer stream that is fed to a die to produce a layered extrudate. Coextrusion can be employed in film blowing, sheet and flat film extrusion, blow molding, and extrusion coating.

In embodiments, the multilayer film has a free shrink of at least 60%, 65% and 70% at 85° C. measured in accordance with ASTM D2732. As used herein, the phrase "free shrink" refers to the percent dimensional change in a 10 cm×10 cm specimen of film, when shrunk at 185° F., with the quantitative determination being carried out according to ASTM D2732 "Standard Test Method for Unrestrained Linear Thermal Shrinkage of Plastic Film and Sheeting." Unless otherwise indicated, all free shrink values disclosed herein are, of course, "total" free shrink values, which represent a sum of (a) the percent free shrink in the longitudinal (i.e., "machine") direction dimension and (b) the percent free shrink in transverse direction.

Residual force of a multilayer film generally allows the package to remain taught and gives good presentation of a product therein through the shelf life of the product. In embodiments, the residual force of the multilayer film is at least 75, 100, 125, 150, 175 or 200 gram force in either the machine or traverse directions as measured in accordance with residual force test stated herein. In embodiments, the residual force of the multilayer film is at least 75, 100, 125, 150, 175 or 200 gram force in both the machine and traverse directions as measured in accordance with residual force test recited herein. In embodiments the multilayer film also exhibits between 10-50 kg/cm$^2$ of shrink tension in either of the machine or traverse directions as measured in accordance with ASTM D2838. In embodiments the multilayer film also exhibits between 10-50 kg/cm$^2$ of shrink tension both the machine and traverse directions as measured in accordance with ASTM D2838.

One or more of the layers of the film—or at least a portion of the entire film—may be cross-linked, for example, to improve the strength or change the melt or softening characteristics of the film. Cross-linking may be achieved by using chemical additives or by subjecting one or more film layers to one or more energetic radiation treatments—such as ultraviolet, or ionizing radiation such as X-ray, gamma ray, beta ray, and high energy electron beam treatment—to induce cross-linking between molecules of the irradiated material. Useful ionizing radiation dosages include at least about, and/or at most about, any of the following: 5, 7, 10, 15, 20, 25, 30, 35, 40, 45, 50, 55, 60, 65, 70, 75, 80, 90, 100, 110, 120, 130, and 150 kGy (kiloGray). In embodiments, the film is irradiated to a level of 20 to 80 kGy. In an embodiment film is irradiated to a level of less than 50 kGy. In an embodiment film is irradiated to a level of less than 40 kGy. The cross-linking may occur before the orientation process, for example, to enhance the film strength before orientation, or the cross-linking may occur after the orientation process. By not imparting enough cross linking in the film, the resulting film may demonstrate poor puncture resistance, tensile strength, elongation at break, free shrink, processability, machinability, and other physical properties. However, implementing too much cross linking can adversely affect the recyclability of the multilayer film.

It may be desirable to avoid irradiating one or more film layers. To that end, one or more layers may be extruded and irradiated, and subsequent layers may then be applied to the irradiated substrate, for example, by an extrusion coating process. This will produce an extrusion coating interface, with at least one layer substantially devoid of crosslinks.

The multilayer film exhibits good optical properties, both before and after shrink. In addition, in packaging products, the film exhibits low haze both over the product area, and on the area of the package beyond the seals. For film haze and film gloss tests were performed prior to shrinking the film and also after shrinking the film by preparing a 10 cm×10 cm specimen of film and shrinking the film at 185° F. as described in ASTM D2732.

Film haze values were measured in accordance with ASTM D 1003-00 "Standard Test Method for Haze and Luminous Transmittance of Transparent Plastics", published July 2000, which is hereby incorporated, in its entirety, by reference thereto. The results are reported herein as "percent haze". The multilayer, heat-shrinkable film can exhibit a haze after shrink of less than 50 percent, less than 45 percent, or less than 40 percent, or less than 35 percent, measured using ASTM D 1003-00. Haze results were also measured by packaging a product within the film as described herein.

Film gloss values were measured in accordance with ASTM D 2457-97 "Standard Test Method for Specular Gloss of Plastic Films and Solid Plastics", published Jan. 10, 1997, which is hereby incorporated, in its entirety, by reference thereto. The results are reported herein as "percent gloss". The film can exhibit a gloss, as measured using ASTM D 2457-97, of from 60 to 100, or from 70 to 90.

In embodiments, to assist in the recyclability of the film, the amount of polyamide contained in the film is limited. In embodiments, the multilayer shrink film has less than 5, 3 or 1 wt % polyamide. In other embodiments, the multilayer shrink film is substantially polyamide free. "Polyamide" herein refers to polymers having amide linkages along the molecular chain, and preferably to synthetic polyamides such as nylons. Furthermore, such term encompasses both polymers comprising repeating units derived from monomers, such as caprolactam, which polymerize to form a polyamide, as well as polymers of diamines and diacids, and copolymers of two or more amide monomers, including nylon terpolymers, sometimes referred to in the art as "copolyamides." In embodiments the multilayer film has a total polyolefin content of at least 60 wt %, 65 wt %, 70 wt %, 75 wt %, 80 wt %, 85 wt %, 90 wt % or 95 wt %.

Guidelines for determining recyclability of polyethylene containing films is provided by the Association of Plastic Recyclers. "APR Benchmark Polyethylene(PE) Films and Flexible Packaging Innovation Test Protocol" Document number FILMS1-BG01—Publication or Revision Date: Oct. 24, 2018, and "Critical Guidance Protocol for PE Film and Flexible Packaging" Document number—FPE-CG-01—Revision date—Aug. 31, 2020, the contents of both are incorporated herein by reference. A variety of film concentration blends (such as F-12.5% and F-25%) are prepared and compared to a control. Physical properties of a blown film are compared to the physical properties of the control film. There are different methods for selecting a control film. In one embodiment, the control is selected by selecting the polyolefin of the multilayer shrink film which is present in the greatest weight percent. The polyolefin which is present in the greatest weight percent is then selected to be the polyolefin that will be made into the control film. The control film is 100% the polyolefin which is present in the greatest weight percent of the multilayer shrink film. The testing protocol and physical properties are then prepared and measured as stated in the APR Benchmark Polyethylene (PE) Films and Flexible Packaging Innovation Test Protocol or Critical Guidance Protocol for PE Film and Flexible Packaging.

In another embodiment, the control is selected to more mimic the multilayer shrink film. The control film is made by using all of the polyolefins that found in the multilayer shrink film. The control film is a blend of all of the polyolefins contained in the multilayer shrink film. The ratio of the blend of all of the polyolefins in the control film is selected to mirror the blend of polyolefins of the test films. In an embodiment, the ratio of the blend of all of the polyolefins in the control film is not more than 5% different from the ratio of the blend of polyolefins in the multilayer shrink film. The ratio of the blend being calculated based on the wt % of the polyolefins in the multilayer shrink film and by disregarding all non-polyolefins contained in the multilayer shrink film. For example, if the test film contained 50% LDPE, 20%, LLDPE, 20%, MDPE and 10% EVOH, the control film would then contain 55.6% LDPE, 22.2%, LLDPE and 22.2%, MDPE.

Once the control film and the test films (such as F-12.5% and F-25%) are prepared, the physical properties are measured. The difference in physical properties between, the test films (such as F-12.5% and F-25%) and the control film (F-0%). In embodiments, test films that contain the multilayer film (such as F-12.5% and F-25%) has a tensile strength at break measured in accordance with ASTM D822 of no more than 35%, 30%, 25% or 20% delta as compared to an F-0% blend of a control film. In embodiments, test films that contain the multilayer film (such as F-12.5% and F-25%) has an Elongation at Yield in both the MD and TD measured in accordance with ASTM D822 of no more than 35%, 30%, 25% or 20% delta as compared to an F-0% blend of a control film. In embodiments, test films that contain the multilayer film (such as F-12.5% and F-25%) has a dart impact measured in accordance with ASTM D1709 of no more than 35%, 30%, 25% or 20% delta as compared to an F-0% blend of a control film.

The multilayer film disclosed herein can have a total thickness of between 1.5-4 mils, so long as the film provides the desired properties for the particular packaging operation in which the film is used. In an embodiment, the film has a total thickness (i.e., a combined thickness of all layers), of from about 1.0 to 5 mils (1 mil is 0.001 inch); in another embodiment, from about 1.5 to 4 mils; in another embodiment, less than 3 mils.

FIG. 1 illustrates a schematic of a process for producing a heat-shrinkable multilayer film in accordance with the present invention. In the process illustrated in FIG. 1, solid polymer beads (not illustrated) are fed to a plurality of extruders 10 (for simplicity, only one extruder is illustrated). Inside extruders 10, the polymer beads are forwarded, melted, and degassed, following which the resulting bubble-free melt is forwarded into die head 12, and extruded through an annular die, resulting in tubing 14 which is 8 to 16 mils thick, or in other embodiments 10 to 14 mils thick, and in yet other embodiments 12 to 25 mil thick.

After cooling or quenching by water spray from cooling ring 16, tubing 14 is collapsed by pinch rolls 18, and is thereafter fed through irradiation vault 20 surrounded by shielding 22, where tubing 14 is irradiated with high energy electrons (i.e., ionizing radiation) from iron core transformer accelerator 24. Tubing 14 is guided through irradiation vault 20 on rolls 26. In embodiments, tubing 14 is irradiated to a level of about 20 to 80 kiloGrays (kGy). In an embodiment the tubing 14 is irradiated to a level of less than 50 kGy.

After irradiation, irradiated tubing 28 is directed through nip rolls 30, following which tubing 28 is slightly inflated, resulting in slightly inflated tubing 32 which contains a trapped bubble of air. However, slightly inflated tubing 32 is not significantly drawn longitudinally, as the surface speed of nip rolls 34 are about the same speed as nip rolls 30. Furthermore, slightly inflated tubing 32 is inflated only enough to provide a substantially circular tubing without significant transverse orientation, i.e., without stretching.

The slightly inflated, irradiated tubing 36 is passed through vacuum chamber 36, and thereafter forwarded through coating die 38. Second tubular film 40 is melt extruded from coating die 38 and coated onto slightly inflated, irradiated tube 32, to form multi-ply tubular film 42.

After irradiation and coating, multi-ply tubing film 42 is wound up onto windup roll 44. Thereafter, windup roll 44 is removed and installed as unwind roll 46, on a second stage in the process of making the tubing film as ultimately desired. Multi-ply tubular film 42, from unwind roll 46, is unwound and passed over guide roll 50, after which multi-ply tubular film 42 passes into hot water bath tank 52 containing hot water 54. The now collapsed, irradiated, coated tubular film 42 is submersed in hot water 54 (having a temperature from about 180° F. to 210° F.) for a retention time of at least about 5 seconds, i.e., for a time period in order to bring the film up to the desired temperature for biaxial orientation. Thereafter, irradiated tubular film 42 is directed through nip rolls 56, and bubble 58 is blown, thereby transversely stretching tubular film 42. Furthermore, while being blown, i.e., transversely stretched, nip rolls 60 draw tubular film 42 in the longitudinal direction, as nip rolls 60 have a surface speed higher than the surface speed of nip rolls 56. As a result of the transverse stretching and longitudinal drawing, partially-irradiated, coated, biaxially-oriented blown tubing film 62 is produced. This blown tubing having been both stretched in the machine and transverse directions resulting in a total orientation ratio of from about 1:10-1:15. The total orientation ratio being calculated by multiplying the ratio of film stretching in the machine direction by the ratio of film stretching in the transverse direction. The film stretching is determined by measuring the thickness prior to orientation and the thickness after orientation. While bubble 58 is maintained between pinch rolls 56 and 60, blown tubing film 62 is collapsed by rolls 64, and thereafter conveyed through nip rolls 60 and across guide roll 66, and then rolled onto wind-up roll 68. Idler roll 70 assures a good wind-up. The term "oriented" refers to a thermoplastic web which forms a film structure in which the web has been elongated in either one direction ("uniaxial") or two directions ("biaxial") at elevated temperatures followed by being set in the elongated configuration by cooling the material while substantially retaining the elongated dimensions. This combination of elongation at elevated temperatures followed by cooling causes an alignment of the polymer chains to a more parallel configuration, thereby modifying the mechanical properties of the polymer web.

Upon subsequently heating of certain unrestrained, unannealed, oriented sheet of polymer to its orientation temperature, heat shrinkage may be produced.

Figure 2:
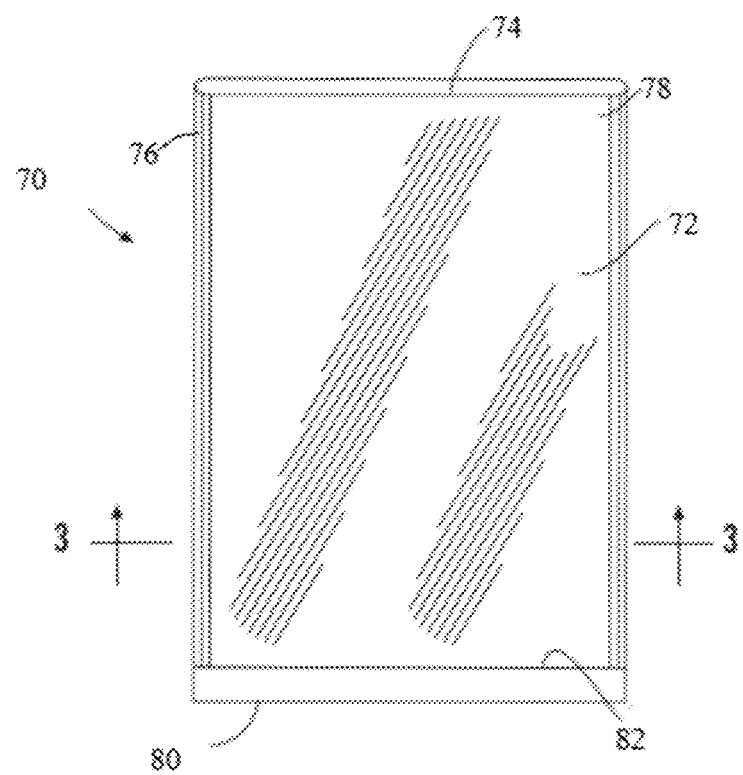
FIG. 2 is a schematic of an end-seal bag.
Figure 3:
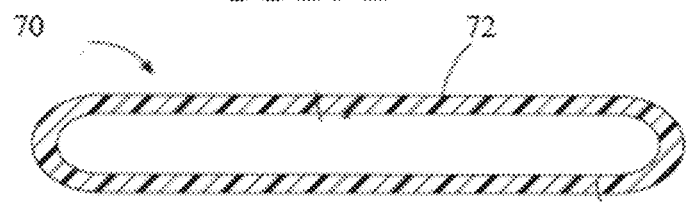
FIG. 3 is a transverse cross-sectional view taken through section 3-3 of FIG. 2.

FIG. 2 is a schematic of an end seal bag 70, in a lay-flat position, this bag being in accord with the present invention. FIG. 3 is a cross-sectional view of bag 70 taken through section 3-3 of FIG. 2. Viewing FIGS. 2 and 3 together, bag 70 comprises seamless tubular bag film 72, with top edge 74 defining an open top, first folded (i.e., seamless) bag side edge 76, second folded (i.e., seamless) bag side edge 78, bottom edge 80, and transverse end seal 82 in which the heat seal layer of the film is sealed to itself to close the bottom of the bag.

Figure 4:
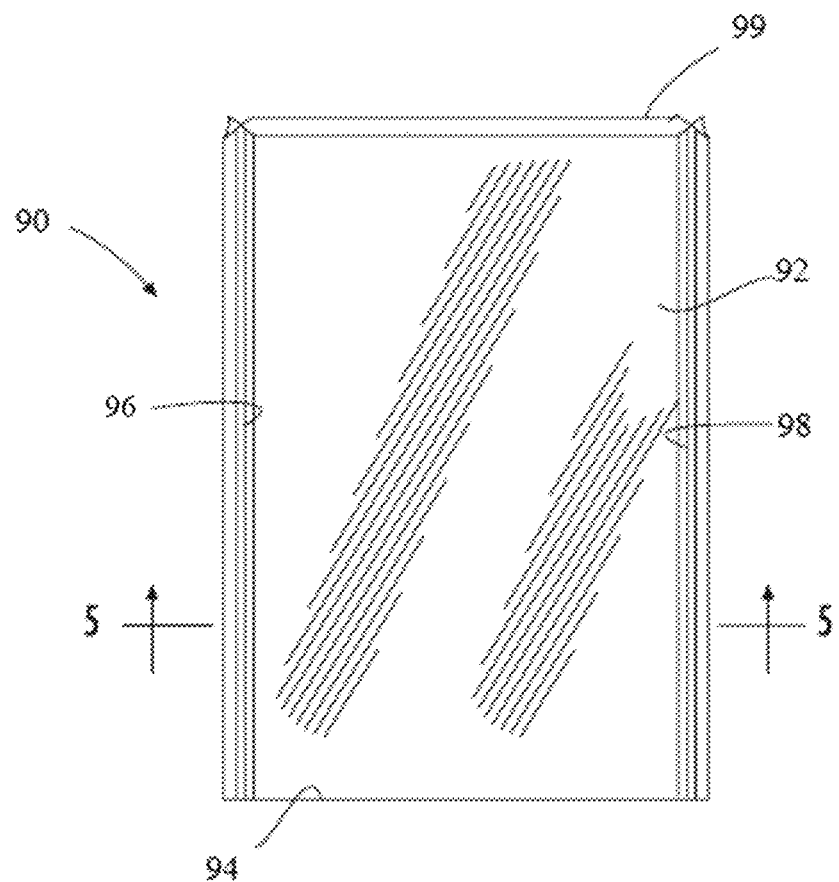
FIG. 4 is a schematic of a side-seal bag.
Figure 5:
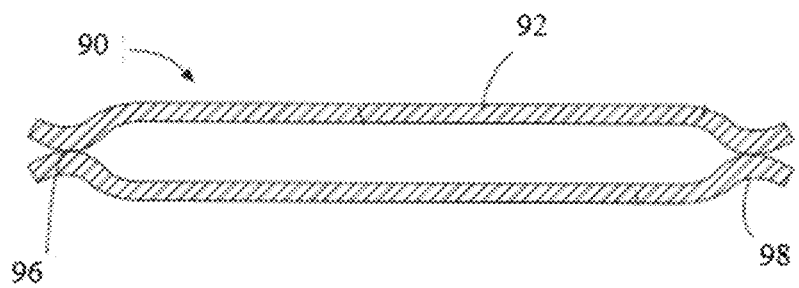
FIG. 5 is a transverse cross-sectional view taken through section 5-5 of FIG. 4.

FIGS. 4 and 5 illustrate side-seal bag 90, with FIG. 4 illustrating a schematic of side seal bag 90 in lay-flat position, and FIG. 5 illustrating a transverse cross-section through section 5-5 of FIG. 4. With reference to FIGS. 4 and 5 together, side seal bag 90 is comprised of bag film 92, folded (i.e., seamless) bottom edge 94, first side seal 96, and second side seal 98, and with top edge 99 defining the open top of the bag.

Figure 6:
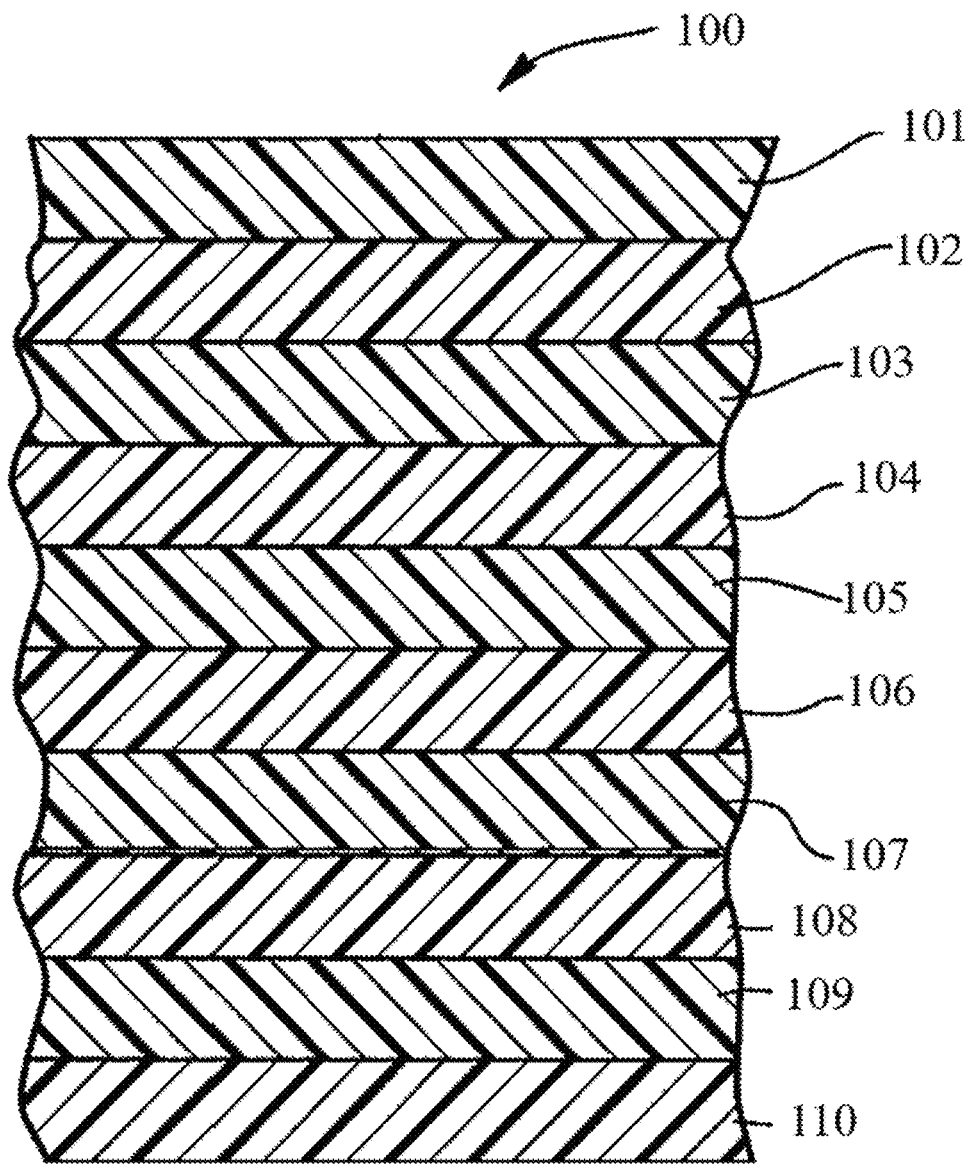
FIG. 6 is a cross-sectional side view of a multilayer film in accordance with some embodiments.

Referring now to FIG. 6 a cross-sectional side view of a multilayer film is shown. While a 10-layer structure is depicted, it is understood that other layer structure beyond those depicted are contemplated. The multilayer film 100 of FIG. 6 includes a first outer layer 101 that is a heat seal layer. A bulk layer 102 is directly adhered to the first outer layer 101 one side and to a tie layer 103 on the other side. The multilayer film 100 includes four tie layers 103, 105, 107 and 109. In embodiments, the tie layers are substantially the same composition. In embodiments, at least one of the tie layers is of a composition distinct from one of the tie layers. The first barrier layer 104 is directly adhered to a tie layer 103 on one side and to tie layer 105 on the other. Bulk layer 106 is directly adhered to tie layer 105 on one side and to tie layer 107 on the other. The second barrier layer 108 is directly adhered to tie layer 107 on one side and to tie layer 109 on the other. In an embodiment, the first and second barrier layers are substantially the same composition. In embodiments, the first and second barrier layers are of distinct compositions. Tie layer 109 is directly adhered to second barrier layer 108 on one side and the outer layer 110 on the other.

All references to (and incorporations by reference of) ASTM protocols are to the most-recently published ASTM procedure as of the priority (i.e., original) filing date of this patent application in the United States Patent Office unless stated otherwise.

Examples

TABLE I

Identity of Resins Used in Examples

| Code | Generic Name | Vendor | Trade Name | Density g/cm$^3$ ASTM D1238 | Melt flow rate g/10 min (190° C./ 02.16 kg) ASTM D1238 | Comonomer Content (%) |
|---|---|---|---|---|---|---|
| EMAA | Ethylene/Methacrylic Acid Copolymer | DOW | NUCREL 1202HC | 0.94 | 1.5 | 12 |
| EMA-md | Maleic Anhydride-Modified Ethylene/Methyl Acrylate Copolymer | DOW | BYNEL 21E787 | 0.930 | 1.6 | |
| EVA1 | Ethylene/Vinyl Acetate Copolymer | Celanese Chemicals | Ateva 2861A | 0.949 | 6.65 | 28 |
| EVA2 | Ethylene/Vinyl Acetate Copolymer | ExxonMobil | ESCORENE ULTRA FL00119 | 0.942 | 0.65 | 19 |
| EVA3 | Ethylene/Vinyl Acetate Copolymer | DOW | ELVAX 3165 | 0.940 | 0.70 | 18 |
| EVA4 | Ethylene/Vinyl Acetate Copolymer | ExxonMobil | ESCORENE LD 713.93 | 0.933 | 3.5 | 14.4 |
| EVA5 | Ethylene/Vinyl Acetate Copolymer | Westlake Chemical | EB524AA | 0.934 | 3.5 | 14.5 |
| EVOH1 | Ethylene/Vinyl Acetate Copolymer - 48 mole % Ethylene | Kuraray | eval g176B | 1.12 | 6.25 | 48 |
| EVOH2 | Ethylene/Vinyl Acetate Copolymer - 38 mole % Ethylene | Kuraray | EVAL XEP 1393B | 1.17 | 1.7 | 38 |
| EVOH3 | Ethylene/Vinyl Acetate Copolymer - 48 mole % Ethylene | Kuraray | EVAL G156B | 1.12 | 6.4 | 48 |

TABLE I-continued

Identity of Resins Used in Examples

| Code | Generic Name | Vendor | Trade Name | Density g/cm³ ASTM D1238 | Melt flow rate g/10 min (190° C./02.16 kg) ASTM D1238 | Comonomer Content (%) |
|---|---|---|---|---|---|---|
| EVOH4 | Ethylene/Vinyl Acetate Copolymer - 38 mole % Ethylene | Nippon Gohsei | Soarnol GH3804B | 1.15 | 3.8 | 38 |
| EVOH5 | Ethylene/Vinyl Acetate Copolymer - 44 mole % Ethylene | | | 1.14 | 3.8 | 44 |
| EVOH6 | Ethylene/Vinyl Acetate Copolymer | Total Petrochemicals | 1003 VN 4 | 0.935 | 0.38 | 13.5 |
| ION | Ionomer - Zinc Neutralized Ethylene Methacrylic Acid Copolymer | DOW | Surlyn 1702-1 | 0.950 | 14.00 | 14-16 |
| LLDPE1 | LLDPE - Ethylene/Hexene Copolymer - Linear, Single Site | ExxonMobil | Exceed 3812PA | 0.912 | 3.8 | |
| LLDPE2 | LLDPE - Ethylene/Hexene Copolymer - Linear, Single Site | ExxonMobil | Exceed XP 8784ML | 0.914 | 0.8 | |
| LLDPE3 | LLDPE - Linear Low Density Ethylene/Hexene Copolymer - Linear, Ziegler/Natta | ExxonMobil | LL3003.39 | 0.918 | 3.2 | |
| LLDPE4 | LLDPE - Ethylene/Octene Copolymer - Branched, Single Site | DOW | Innate XUS 59910.04 | 0.915 | 1.06 | |
| LLDPE5 | LLDPE - Ethylene/Hexene Copolymer - Linear, Single Site | Exxon Mobil | Exceed 1012MA | 0.912 | 1.0 | |
| LLDPE6 | LLDPE - Ethylene/Octene Copolymer - Linear, Ziegler/Natta | DOW | DOWLEX 2045.03 | 0.9202 | 1.10 | 6.5 |
| LLDPE-md | Maleic Anhydride-Modified LLDPE | Mitsui | ADMER NF518E | 0.910 | 3.1 | |
| OBC | Ethylene/Octene Block copolymer | DOW | Infuse 9100 | 0.877 | 1.0 | |
| PA | Polyamide - 6/12 | EMS-Grivory | GRILON CF6S | 1.0500 | 5.75 | |
| PET | Polyethylene Terephthalate | Indorama | RAMAPET N180 | | | |
| PP1 | Propylene/Ethylene/Butene Copolymer | LyondellBasell Industries | ADSYL 5C37F | 0.899 | 5.5 | 3.3 |
| PP2 | Propylene/Ethylene Copolymer - Single Site | Exxon Mobil | Vistamaxx 3980FL | 0.878 | 8 | 9 |
| PP3 | Propylene/Ethylene Copolymer | LyondellBasell Industries | adsyl 7416 XCP | 0.900 | 7.5 | |
| PVDC | Vinylidene Chloride/Methyl Acrylate Copolymer | Solvay | IXAN PV910 | 1.71 | | 8.4 |

TABLE I-continued

Identity of Resins Used in Examples

| Code | Generic Name | Vendor | Trade Name | Density g/cm³ ASTM D1238 | Melt flow rate g/10 min (190° C./ 02.16 kg) ASTM D1238 | Comonomer Content (%) |
|---|---|---|---|---|---|---|
| VLDPE1 | VLDPE - Ethylene/Hexene Copolymer - Linear, Single Site | Prime Polymer Co Ltd | Evolue SP0510 | 0.904 | 1.20 | |
| VLDPE2 | VLDPE - Ethylene/Octene Copolymer - Linear, Ziegler/Natta | DOW | XUS 61520.15L | 0.9030 | 0.5 | 11.5 |
| VLDPE3 | VLDPE - Ethylene/Octene Copolymer - Branched, Single Site | DOW | AFFINITY PL 1850G | 0.9020 | 3.0 | 12 |
| VLDPE4 | VLDPE - Ethylene/Octene Copolymer - Linear, Single Site | Borealis | QUEO 1007 | 0.910 | 6.6 | |
| VLDPE5 | VLDPE - Ethylene/Octene Copolymer - Branched, Single Site | DOW | AFFINITY PL 1880G | 0.902 | 1.1 | |
| VLDPE6 | VLDPE - ethylene/Octene Copolymer - Branched, Single Site | DOW | AFFINITY PL 1281G1 | 0.900 | 6.0 | 13 |
| VLDPE-md | Maleic Anhydride-Modified VLDPE | | | 0.87 | 3 | |

The films listed in Table II where made via the process 40 described in regarding to FIG. 1 as shown herein.

TABLE II

Film formulations

| Film | Film 1 (C) | Thickness (%) | Film 2 (C) 1.77 mils | Thickness (%) | Film 3 (C) 1.78 mils | Thickness (%) | Film 4 (C) 1.76 mils | Thickness (%) |
|---|---|---|---|---|---|---|---|---|
| Layer 1 | VLDPE6 80% LLDPE3 20% | 21.65 | VLDPE6 80% VLDPE4 20% | 20 | VLDPE6 80% VLDPE4 20% | 27.84 | VLDPE6 80% LLDPE1 20% | 18.18 |
| Layer 2 | VLDPE2 70% EVA4 30% | 38.96 | VLDPE5 60% EMAA 40% | 28.33 | VLDPE1 60% LLDPE2 25% EVA2 15% | 17.53 | VLDPE2 50% EVA3 50% | 11.36 |
| Layer 3 | EVA5 100% | 4.33 | EVA2 100% | 15 | LLDPE-md 100% | 7.63 | LLDPE4 70% VLDPE-md 30% | 7.27 |
| Layer 4 | PVDC 100% | 9.09 | PVDC 100% | 10.17 | EVOH2 85% PA 15% | 7.22 | EVOH4 70% EVOH1 30% | 8.18 |

TABLE II-continued

Film formulations

| Layer | | | | | | | | |
|---|---|---|---|---|---|---|---|---|
| Layer 5 | EVA1 100% | 4.33 | EVA2 100% | 8.33 | LLDPE-md 100% | 7.84 | LLDPE4 70% VLDPE-md 30% | 7.27 |
| Layer 6 | VLDPE2 70% EVA4 30% | 12.99 | VLDPE3 70% EVOH6 30% | 18.17 | VLDPE1 60% LLDPE2 25% EVA2 15% | 18.56 | VLDPE2 50% EVA3 50% | 11.36 |
| Layer 7 | VLDPE3 80% LLDPE6 20% | 8.66 | | | EMA-md 100% | 7.22 | LLDPE4 70% VLDPE-md 30% | 11.36 |
| Layer 8 | | | | | PET 100% | 6.19 | VLDPE2 50% EVA3 50% | 4.55 |
| Layer 9 | | | | | | | LLDPE4 70% VLDPE-md 30% | 11.36 |
| Layer 10 | | | | | | | PP1 85% OBC 15% | 9.09 |

| Film | Film 5 (C) 1.76 mils | Thickness (%) | Film 6 1.77 mils | Thickness (%) | Film 7 1.77 mils | Thickness (%) | Film 8 1.76 mils | Thickness (%) |
|---|---|---|---|---|---|---|---|---|
| Layer 1 | VLDPE6 80% LLDPE1 20% | 18.18 | VLDPE6 80% LLDPE3 20% | 20 | VLDPE6 80% LLDPE3 20% | 20 | VLDPE6 80% LLDPE1 20% | 18.18 |
| Layer 2 | VLDPE2 50% EVA3 50% | 11.36 | VLDPE2 50% EVA3 50% | 15 | VLDPE2 50% EVA3 50% | 15 | VLDPE2 50% EVA3 50% | 13.64 |
| Layer 3 | LLDPE4 70% VLDPE-md 30% | 7.27 | LLDPE5 50% LLDPE1 30% VLDPE-md 20% | 8 | LLDPE5 45% LLDPE1 25% VLDPE-md 30% | 8 | LLDPE4 70% VLDPE-md 30% | 7.27 |
| Layer 4 | VLDPE2 50% EVA3 50% | 4.55 | EVOH2 90% ION 10% | 4 | EVOH4 80% EVOH3 20% | 4 | EVOH4 70% EVOH1 30% | 3.64 |
| Layer 5 | LLDPE4 70% VLDPE-md 30% | 7.27 | LLDPE5 50% LLDPE1 30% VLDPE-md 20% | 8 | LLDPE5 45% LLDPE1 25% VLDPE-md 30% | 8 | LLDPE4 70% VLDPE-md 30% | 7.27 |
| Layer 6 | VLDPE2 50% EVA3 50% | 11.36 | VLDPE2 50% EVA3 50% | 15 | VLDPE2 50% EVA3 50% | 15 | VLDPE2 50% EVA3 50% | 13.64 |
| Layer 7 | LLDPE4 70% VLDPE-md 30% | 11.36 | LLDPE5 50% LLDPE1 30% VLDPE-md 20% | 8 | LLDPE5 45% LLDPE1 25% VLDPE-md 30% | 8 | LLDPE4 70% VLDPE-md 30% | 11.36 |
| Layer 8 | EVOH4 70% EVOH1 30% | 8.18 | EVOH2 90% ION 10% | 4 | EVOH4 80% EVOH3 20% | 4 | EVOH4 70% EVOH1 30% | 4.55 |
| Layer 9 | LLDPE4 70% VLDPE-md 30% | 11.36 | LLDPE5 50% LLDPE1 30% VLDPE-md 20% | 8 | LLDPE5 45% LLDPE1 25% VLDPE-md 30% | 8 | LLDPE4 70% VLDPE-md 30% | 11.36 |
| Layer 10 | PP1 85% OBC 15% | 9.09 | PP3 85% PP2 15% | 10 | PP1 85% OBC 15% | 10 | PP1 85% OBC 15% | 9.09 |

TABLE II-continued

Film formulations

| Film | Film 9<br>1.77 mils | Thickness (%) | Film 10<br>1.77 mils | Thickness (%) | Film 11<br>1.77 mils | Thickness (%) | Film 12<br>1.77 mils | Thickness (%) |
|---|---|---|---|---|---|---|---|---|
| Layer 1 | VLDPE6 80%<br>LLDPE3 20% | 20 | VLDPE6 80%<br>LLDPE3 20% | 20 | VLDPE6 80%<br>LLDPE3 20% | 20 | VLDPE6 80%<br>LLDPE3 20% | 20 |
| Layer 2 | VLDPE2 50%<br>EVA3 50% | 15 | VLDPE2 50%<br>EVA3 50% | 15 | VLDPE2 50%<br>EVA3 50% | 15 | VLDPE2 50%<br>EVA3 50% | 15 |
| Layer 3 | LLDPE5 50%<br>LLDPE1 30%<br>VLDPE-md 20% | 8 | LLDPE5 50%<br>LLDPE1 30%<br>VLDPE-md 20% | 8 | LLDPE5 50%<br>LLDPE1 30%<br>VLDPE-md 20% | 8 | LLDPE5 50%<br>LLDPE1 30%<br>VLDPE-md 20% | 8 |
| Layer 4 | EVOH4 100% | 4 | EVOH4 90%<br>ION 10% | 4 | EVOH4 90%<br>EVOH3 10% | 4 | EVOH4 90%<br>EVOH1 10% | 4 |
| Layer 5 | LLDPE5 50%<br>LLDPE1 30%<br>VLDPE-md 20% | 8 | LLDPE5 50%<br>LLDPE1 30%<br>VLDPE-md 20% | 8 | LLDPE5 50%<br>LLDPE1 30%<br>VLDPE-md 20% | 8 | LLDPE5 50%<br>LLDPE1 30%<br>VLDPE-md 20% | 8 |
| Layer 6 | VLDPE2 50%<br>EVA3 50% | 15 | VLDPE2 50%<br>EVA3 50% | 15 | VLDPE2 50%<br>EVA3 50% | 15 | VLDPE2 50%<br>EVA3 50% | 15 |
| Layer 7 | LLDPE5 50%<br>LLDPE1 30%<br>VLDPE-md 20% | 8 | LLDPE5 50%<br>LLDPE1 30%<br>VLDPE-md 20% | 8 | LLDPE5 50%<br>LLDPE1 30%<br>VLDPE-md 20% | 8 | LLDPE5 50%<br>LLDPE1 30%<br>VLDPE-md 20% | 8 |
| Layer 8 | EVOH4 100% | 4 | EVOH4 90%<br>ION 10% | 4 | EVOH4 90%<br>EVOH3 10% | 4 | EVOH4 90%<br>EVOH1 10% | 4 |
| Layer 9 | LLDPE5 50%<br>LLDPE1 30%<br>VLDPE-md 20% | 8 | LLDPE5 50%<br>LLDPE1 30%<br>VLDPE-md 20% | 8 | LLDPE5 50%<br>LLDPE1 30%<br>VLDPE-md 20% | 8 | LLDPE5 50%<br>LLDPE1 30%<br>VLDPE-md 20% | 8 |
| Layer 10 | PP3 85%<br>PP2 15% | 10 | PP3 85%<br>PP2 15% | 10 | PP3 85%<br>PP2 15% | 10 | PP3 85%<br>PP2 15% | 10 |

| Film | Film 13<br>1.77 mils | Thickness (%) | Film 14<br>1.77 mils | Thickness (%) | Film 15<br>1.77 mils | Thickness (%) | Film 16<br>1.77 mils | Thickness (%) |
|---|---|---|---|---|---|---|---|---|
| Layer 1 | VLDPE6 80%<br>LLDPE3 20% | 20 | VLDPE6 80%<br>LLDPE3 20% | 20 | VLDPE6 80%<br>LLDPE3 20% | 20 | VLDPE6 80%<br>LLDPE3 20% | 20 |
| Layer 2 | VLDPE2 50%<br>EVA3 50% | 15 | VLDPE2 50%<br>EVA3 50% | 15 | VLDPE2 50%<br>EVA3 50% | 15 | VLDPE2 50%<br>EVA3 50% | 15 |
| Layer 3 | LLDPE5 50%<br>LLDPE1 30%<br>VLDPE-md 20% | 8 | LLDPE5 50%<br>LLDPE1 30%<br>VLDPE-md 20% | 8 | LLDPE5 50%<br>LLDPE1 30%<br>VLDPE-md 20% | 8 | LLDPE5 50%<br>LLDPE1 30%<br>VLDPE-md 20% | 8 |
| Layer 4 | EVOH2 90%<br>ION 10% | 4 | EVOH4 80%<br>EVOH3 20% | 4 | EVOH4 70%<br>EVOH3 30% | 4 | EVOH5 100% | 4 |

TABLE II-continued

Film formulations

| Film | | | | | | | | |
|---|---|---|---|---|---|---|---|---|
| Layer 5 | LLDPE5 50% LLDPE1 30% VLDPE-md 20% | 8 | LLDPE5 50% LLDPE1 30% VLDPE-md 20% | 8 | LLDPE5 50% LLDPE1 30% VLDPE-md 20% | 8 | LLDPE5 50% LLDPE1 30% VLDPE-md 20% | 8 |
| Layer 6 | VLDPE2 50% EVA3 50% | 15 | VLDPE2 50% EVA3 50% | 15 | VLDPE2 50% EVA3 50% | 15 | VLDPE2 50% EVA3 50% | 15 |
| Layer 7 | LLDPE5 50% LLDPE1 30% VLDPE-md 20% | 8 | LLDPE5 50% LLDPE1 30% VLDPE-md 20% | 8 | LLDPE5 50% LLDPE1 30% VLDPE-md 20% | 8 | LLDPE5 50% LLDPE1 30% VLDPE-md 20% | 8 |
| Layer 8 | EVOH2 90% ION 10% | 4 | EVOH4 80% EVOH3 20% | 4 | EVOH4 70% EVOH3 30% | 4 | EVOH5 100% | 4 |
| Layer 9 | LLDPE5 50% LLDPE1 30% VLDPE-md 20% | 8 | LLDPE5 50% LLDPE1 30% VLDPE-md 20% | 8 | LLDPE5 50% LLDPE1 30% VLDPE-md 20% | 8 | LLDPE5 50% LLDPE1 30% VLDPE-md 20% | 8 |
| Layer 10 | PP1 85% OBC 15% | 10 | PP1 85% OBC 15% | 10 | PP1 85% OBC 15% | 10 | PP1 85% OBC 15% | 10 |

| Film | Film 17 (C) 1.77 mils | Thickness (%) | Film 18 (C) 1.78 mils | Thickness (%) | Film 19 1.77 mils | Thickness (%) | Film 20 1.76 mils | Thickness (%) |
|---|---|---|---|---|---|---|---|---|
| Layer 1 | VLDPE6 80% VLDPE4 20% | 20 | VLDPE6 80% VLDPE4 20% | 27.84 | VLDPE6 80% LLDPE3 20% | 20 | VLDPE6 80% LLDPE1 20% | 18.18 |
| Layer 2 | VLDPE5 60% EMAA 40% | 28.33 | VLDPE1 60% LLDPE2 25% EVA2 15% | 17.53 | VLDPE2 50% EVA3 50% | 15 | VLDPE2 50% EVA3 50% | 13.64 |
| Layer 3 | EVA2 100% | 15 | LLDPE-md 100% | 7.63 | LLDPE5 50% LLDPE1 30% VLDPE-md 20% | 8 | LLDPE4 70% VLDPE-md 30% | 7.27 |
| Layer 4 | PVDC 100% | 10.17 | EVOH2 85% PA 15% | 7.22 | EVOH2 90% ION 10% | 4 | EVOH4 70% EVOH1 30% | 3.64 |
| Layer 5 | EVA2 100% | 8.33 | LLDPE-md 100% | 7.84 | LLDPE5 50% LLDPE1 30% VLDPE-md 20% | 8 | LLDPE4 70% VLDPE-md 30% | 7.27 |
| Layer 6 | VLDPE3 70% EVOH6 30% | 18.17 | VLDPE1 60% LLDPE2 25% EVA2 15% | 18.56 | VLDPE2 50% EVA3 50% | 15 | VLDPE2 50% EVA3 50% | 13.64 |
| Layer 7 | | | EMA-md 100% | 7.22 | LLDPE5 50% LLDPE1 30% VLDPE-md 20% | 8 | LLDPE4 70% VLDPE-md 30% | 11.36 |
| Layer 8 | | | PET 100% | 6.19 | EVOH2 90% ION 10% | 4 | EVOH4 70% EVOH1 30% | 4.55 |

TABLE II-continued

| | Film formulations | | | | |
|---|---|---|---|---|---|
| Layer 9 | LLDPE5 50% LLDPE1 30% VLDPE-md 20% | 8 | LLDPE4 70% VLDPE-md 30% | 11.36 | |
| Layer 10 | PP3 85% PP2 15% | 10 | PP1 85% OBC 15% | 9.09 | |

The OTR of the films listed in Table II were measured in accordance with ASTM D2732 and the results reported in Table III below.

TABLE III

| | OTR | |
|---|---|---|
| Film | OTR (cc (at STP) per m² per day per 1 atmosphere of oxygen pressure differential measured at 0% relative humidity and 23° C. measured according to ASTM D-3985) | OTR (cc (at STP) per m² per day per 1 atmosphere of oxygen pressure differential measured at 90% relative humidity and 23° C. measured according to ASTM D-3985) |
| Film 4 | 9 | 15 |
| Film 5 | 6 | 17 |
| Film 8 | 8 | 18 |
| Film 9 | 4.4 | 16 |
| Film 10 | 9 | 35 |
| Film 11 | 5.6 | 20 |
| Film 12 | 5.5 | |
| Film 13 | 6.1 | |
| Film 14 | 7.4 | 19 |
| Film 15 | 8.3 | 18 |
| Film 16 | 9.3 | 19 |

As shown in Table IV the films demonstrate acceptable oxygen transmission rates.

TABLE IV

| | Free shrink |
|---|---|
| Film | Total Free shrink % at 85° C. (ASTM D2732) |
| Film 1 | 71% |
| Film 2 | 88% |
| Film 3 | 69% |
| Film 4 | 55% |
| Film 5 | 63% |
| Film 6 | 58% |
| Film 7 | 71%* |
| Film 8 | 61% |

Film denoted with an * was tested directly off the line and show shrink values that are known to occasionally be higher than films that tested at a later date. Film 4 demonstrated poor shirk characteristics.

TABLE V

| | Optical properties | | | |
|---|---|---|---|---|
| Film | Gloss before shrink at 0° (ASTM D2457) | Haze before shrink (ASTM D1003) | Gloss after shrink at 0° (ASTM D2457) | Haze after shrink (ASTM D1003) |
| Film 1 | 83 | 5.4 | 1.7 | 26 |
| Film 2 | | 7 | | |
| Film 3 | | 4 | | |
| Film 4 | 66 | 11.1 | 0.6 | 27.8 |
| Film 5 | 58 | 12.1 | 0.4 | 33.5 |
| Film 8 | 69 | 9.7 | 0.6 | 31.7 |

For film haze and film gloss tests were performed prior to shrinking the film and also after shrinking the film by preparing a 10 cm×10 cm specimen of film and shrinking the film at 185° F. as described in ASTM D2732.

Haze and gloss are traditionally measured on films before or after heat shrinking but do not address how a packaged product looks in the packaging. As such, haze in material contact area after heat treatment and haze on skirt/header after heat treatment are measured as follows and the results reported in Table VI.

The samples are prepared such that the specimen surfaces have good planarity, since surface warpage, waviness, or curvature may seriously affect test results. The surface test areas are be kept free of soil and abrasion.

Sample Preparation a) Prepare 2 bags from each film material to be 10% oversized in width for a teflon dummy product;

b) Make a seal close to the dummy leaving at least 20 cm of bag neck;

c) Mark a square (10×10 cm) on both sides of the bag using the metal stamp;

d) Fill the bags with one teflon dummy taking care that the drawing square is placed in the middle of the sample;

e) Put the package into the chamber of the vacuum sealing machine, placing the product close to the sealing bar;

f) Vacuumize the samples to achieve about 5 mbar of residual vacuum and then apply the seal;

g) Submit the samples to heat treatment in a steam oven at 95° C. for 1 hour;

h) After cooling, open the seals and recovery the bag and the bag neck so as to test gloss and haze according to the following steps.

Testing Procedure

For Haze Test:
  a) Position each specimen (mounted in a holder) against the entrance port of the instrument;
  b) Measure at least three portions of the specimen surface to obtain an indication of uniformity;
  c) Repeat steps from a) to b) for the other two specimens.

For Haze Results:
Calculate the average, the minimum and the maximum of the readings.

Report data expressed as % and indicate "HAZE AFTER HEAT TREATMENT". Results are reported for 1) areas of the film which is in contact with the packaged material and 2) areas of the film in the skirt or header in which the film is not in contact with the packaged material.

TABLE VI

| | Optical properties | |
|---|---|---|
| Film | Haze after heat treatment in material contact area | Haze after heat treatment on skirt/header |
| Film 2 | 11.10% | 95% |
| Film 3 | 11.90% | 96.60% |
| Film 6 | 8.60% | 74.30% |

To further test optical properties films were evaluated by both performing water shrink and air shrink to replicate non-material contact area haze. Haze was evaluated for none shrunk films, films that were shrunk in a water bath at 85° C. and also films shrunk via heated air at 110° C. The results are reported in Table VII.

TABLE VII

| | Haze results | | | | |
|---|---|---|---|---|---|
| Film | Total free shrink in water @ 85° C. (ASTM D2732) | Haze after 85° C. water shrink (ASTM D1003) | Air free shrink @ 110° C. (L-T) (ASTM D2732) | Haze after 110° C. free air shrink (ASTM D1003) | Haze before shrink (ASTM D1003) |
| Film 17 | 83% | 17% | 75%-70% | 98% | 7% |
| Film 18 | 68% | 10% | 51%-45% | 77% | 4% |
| Film 19 | 56% | 6.5% | 52%-57% | 70% | 4% |
| Film 20 | 61% | 22% | 51%-47% | 39% | 9% |

Tensile strength, elongation at break, and Youngs modulus refer to tensile properties measured in accordance with ASTM D882 "Standard Test Method for Tensile Properties of Thin Plastic Sheeting," which is hereby incorporated, in its entirety, by reference thereto. Truburst is measured in accordance with ASTM D3786 Shrink tension is measured in accordance with ASTM D2838.

Residual force is measured at 5° C. on a shrink tension tester which provides a constant temperature rise followed by cooling. Four specimens are prepared as rectangular strips 25.4 mm wide and the average results are reported in Table VIII.

To test the ability of the film to be recycled in polyethylene recycling streams, blown film samples and control films were prepared in accordance with Guidelines for determining recyclability of polyethylene containing films is provided by the Association of Plastic Recyclers. "APR Benchmark Polyethylene(PE) Films and Flexible Packaging Innovation Test Protocol" Document number FILMS1-BG01—Publication or Revision Date: Oct. 24, 2018, and "Critical Guidance Protocol for PE Film and Flexible Packaging" Document number—FPE-CG-01—Revision date—Aug. 31, 2020, and "APR Benchmark Polyethylene(PE) Films and Flexible Packaging Innovation Test Protocol" Document number FILM-B-01—Publication or Revision Date: November, 2020 the contents of each are incorporated herein by reference.

A control film was made by blending 28 wt % VLDPE2, 29 wt % VLDPE6, 17 wt % LLDPE1 and 26 wt % LLDPE5 in order to make the control F0D and F0B. The remaining samples were prepared by utilizing films 7 and 8. Once pellet and blown film samples were prepared according to the benchmark and critical guidance procedures, the samples were evaluated for several of the physical properties listed below in Tables IX-XIII.

TABLE VIII

| | physical properties | | | | | |
|---|---|---|---|---|---|---|
| Film | Truburst psi | Shrink Tension (L-T) kg/cm3 | Residual Force (L-T) gf | Tensile Strength (L-T) psi | Elongation at Break (L-T) | Young's Modulus (L-T) psi |
| Film 1 | 23.6 | | | 11600-11700 | 140%-150% | 29600-31600 |
| Film 2 | 20.1 | 29-21 | 68-61 | | | |
| Film 3 | | 27-29 | 214-211 | | | |
| Film 6 | | 21-28 | 145-146 | | | |
| Film 7 | 18.3 | 24-23 | | | | |
| Film 8 | 19.52 | 22-22 | 100-185 | 11900-6590 | 81%-92% | 37700-29800 |

TABLE IX

APR test data

| Film | Tensile Strength at Yield | Elongation at Yield | Tensile Strength at Break | Elongation at Break | Youngs Modulus (×000) | Thickness |
|---|---|---|---|---|---|---|
| Control F0D MD | 829 | 16.64 | 4977 | 919 | 9.8 | 1.32 |
| Control F0D TD | 678 | 14.75 | 4548 | 894 | 9.5 | 1.3 |
| Film 7 F12.5 MD | 967 | 17.91 | 5206 | 827 | 10.7 | 1.21 |
| Film 7 F12.5 TD | 777 | 9.66 | 3841 | 768 | 16.2 | 1.23 |
| Film 7 F25 MD | 886 | 14.33 | 3943 | 753 | 12.5 | 1.23 |
| Film 7 F25 TD | 773 | 10.33 | 4313 | 846 | 15.1 | 1.26 |
| Control F0P MD | 801 | 14.83 | 4280 | 969 | 10.9 | 1.83 |
| Control F0P TD | 642 | 15.08 | 4012 | 894 | 8.6 | 1.76 |
| Film 7 F50 MD | 883 | 13.58 | 3858 | 787 | 13.1 | 1.77 |
| Film 7 F50 TD | 688 | 9.43 | 3432 | 705 | 14.4 | 1.75 |
| Film 7 F100 MD | 1105 | 13.08 | 2964 | 491 | 17 | 1.63 |
| Film 7 F100 TD | 697 | 11.91 | 2716 | 582 | 11.7 | 1.69 |

TABLE X

APR test data

Delta to Control (%)

| Film | Tensile Strength at Yield | Elongation at Yield | Tensile Strength at Break | Elongation at Break | Youngs Modulus |
|---|---|---|---|---|---|
| Control F0D MD | | | | | |
| Control F0D TD | | | | | |
| Film 7 F12.5 MD | 16.65 | 7.63 | 4.60 | −9.95 | 9.18 |
| Film 7 F12.5 TD | 14.60 | −34.51 | −15.55 | −14.11 | 70.53 |
| Film 7 F25 MD | 6.88 | −13.88 | −20.78 | −17.99 | 27.55 |
| Film 7 F25 TD | 14.01 | −29.97 | −5.17 | −5.37 | 58.95 |
| Control F0P MD | | | | | |
| Control F0P TD | | | | | |
| Film 7 F50 MD | 10.24 | −8.43 | −9.86 | −18.73 | 20.18 |
| Film 7 F50 TD | 7.17 | −37.47 | −14.46 | −21.13 | 67.44 |
| Film 7 F100 MD | 37.95 | −11.80 | −30.75 | −49.30 | 55.96 |
| Film 7 F100 TD | 8.57 | −21.02 | −32.30 | −34.92 | 36.05 |

TABLE XI

APR test data

| Film | Tensile Strength at Yield (psi) | Elongation at Yield (psi) | Tensile Strength at Break (psi) | Elongation at Break (psi) | Youngs Modulus (×1000) | Thickness (mil) | Melt Flow Rate @190° C. g/10 minutes | Melt Flow Rate @230° C. g/10 minutes |
|---|---|---|---|---|---|---|---|---|
| Control F0D MD | 790 | 14.97 | 4792 | 812 | 10.5 | 1.30 | | |
| Control F0D TD | 604 | 12.72 | 3583 | 716 | 9.8 | 1.30 | | |
| Film 8 F12.5 MD | 908 | 12.29 | 5301 | 790 | 14.6 | 1.31 | | |
| Film 8 F12.5 TD | 804 | 12.17 | 4813 | 8789 | 13.8 | 1.31 | | |
| Film 8 F25 MD | 886 | 11.52 | 5260 | 774 | 15.2 | 1.30 | 0.6613 | |
| Film 8 F25 TD | 833 | 13.50 | 4522 | 765 | 12.1 | 1.30 | 0.6613 | |
| Control F0P MD | 807 | 10.33 | 4906 | 893 | 15.4 | 1.73 | 1.317 | 3.0623 |
| Control F0P TD | 744 | 11.01 | 4511 | 846 | 13.3 | 1.73 | 1.317 | 3.0623 |
| Film 8 F50 MD | 944 | 9.34 | 5325 | 812 | 19.9 | 1.73 | 0.2340 | |
| Film 8 F50 TD | 853 | 9.09 | 5031 | 795 | 18.4 | 1.73 | 0.2340 | |
| Film 8 F100 MD | 1151 | 8.66 | 4507 | 715 | 26.7 | 1.74 | | 0.0580 |
| Film 8 F100 TD | 828 | 8.34 | 3836 | 683 | 19.6 | 1.74 | | 0.0580 |

TABLE XII

APR test data

Delta to Control (%)

| Film | Δ Tensile Strength at Yield | Δ Elongation at Yield | Δ Tensile Strength at Break | Δ Elongation at Break | Δ Youngs Modulus | Δ Melt Flow Index @ 190° C. |
|---|---|---|---|---|---|---|
| Control F0D MD | | | | | | |
| Control F0D TD | | | | | | |
| Film 8 F12.5 MD | 14.94 | −17.90 | 10.62 | −2.75 | 39.50 | |
| Film 8 F12.5 TD | 33.11 | −4.32 | 34.33 | 10.19 | 40.82 | |
| Film 8 F25 MD | 12.15 | −23.05 | 9.77 | −4.78 | 44.76 | −0.6557 |
| Film 8 F25 TD | 37.91 | 6.13 | 26.21 | 6.90 | 23.47 | −0.6557 |
| Control F0P MD | | | | | | |
| Control F0P TD | | | | | | |

TABLE XII-continued

APR test data

| | Delta to Control (%) | | | | | |
|---|---|---|---|---|---|---|
| Film | Δ Tensile Strength at Yield | Δ Elongation at Yield | Δ Tensile Strength at Break | Δ Elongation at Break | Δ Youngs Modulus | Δ Melt Flow Index @ 190° C. |
| Film 8 F50 MD | 16398 | −9.58 | 8.54 | −9.10 | 29.22 | −1.083 |
| Film 8 F50 TD | 14.65 | −17.44 | 11.53 | −6.10 | 38.35 | −1.083 |
| Film 8 F100 MD | 42.63 | −16.17 | −8.13 | −19.94 | 73.38 | |
| Film 8 F100 TD | 11.29 | −24.25 | −14.96 | −19.33 | 47.37 | |

Tensile strength, elongation at break, and Youngs modulus refer to tensile properties measured in accordance with ASTM D882 "Standard Test Method for Tensile Properties of Thin Plastic Sheeting," which is hereby incorporated, in its entirety, by reference thereto. Melt flow is measured in accordance with ASTM-D1238 which is hereby incorporated, in its entirety, by reference thereto.

TABLE XIII

Instrumented Impact Testing (ASTM D-1709)

| Film | Peak Force (N) | Total Energy (J) | Peak Displacement (mm) | Thickness (mil) | Peak Force/ Thickness (N/mil) | Δ Peak Force/ mil vs. Control (%) | APR Result |
|---|---|---|---|---|---|---|---|
| Control F0D | 19.75 | 0.44 | 36.71 | 1.07 | 18.46 | | |
| Film 8 F12.5 | 27.92 | 0.62 | 37.94 | 1.42 | 19.66 | 6.52 | Pass |
| Film 8 F25 | 27.83 | 0.61 | 37.21 | 1.93 | 20.02 | 8.47 | Pass |
| Control F0P | 30.19 | 0.68 | 37.73 | 1.67 | 18.08 | | |
| Film 8 F50 | 36.78 | 0.83 | 37.32 | 1.78 | 20.66 | 14.30 | Pass |
| Film 8 F100 | 38.12 | 0.63 | 27.35 | 1.88 | 20.28 | 12.16 | Pass |

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A multilayer shrink film comprising:
    a. a first outer layer being a sealant layer;
    b. a first barrier layer comprising an ethylene-vinyl alcohol copolymer with an ethylene content of between 27-50 mol %;
    c. a second barrier layer comprising an ethylene-vinyl alcohol copolymer with an ethylene content of between 27-50 mol %;
    d. a first tie layer disposed between the first and second barrier layers and directly adhered to at least one of the first or second barrier layer, the tie layer comprising at least one component selected from anhydride modified grafted linear low density polyethylene, anhydride grafted low density polyethylene, anhydride grafted polypropylene, anhydride grafted methyl acrylate copolymer, anhydride grafted butyl acrylate copolymer, homogeneous ethylene/alpha-olefin copolymer, and anhydride grafted ethylene/vinyl acetate copolymer;
    e. a second outer layer being a skin layer;
    wherein one of the first or second barrier layers is cross-linked and one of the first or second barrier layers is not crosslinked;
    the multilayer shrink film having a free shrink of at least 60% at 85° C. measured in accordance with ASTM D2732 an oxygen transmission rate of no more than: 20 cubic centimeters (at standard temperature and pressure) per square meter per day per 1 atmosphere of oxygen pressure differential measured at 0% relative humidity and 23° C. measured according to ASTM D-3985 and a haze after shrink of less than 50% measured in accordance with ASTM D 1003.

2. The multilayer shrink film of claim 1 wherein the first barrier layer comprises a blend of a first ethylene-vinyl alcohol copolymer having a first ethylene content and a second ethylene-vinyl alcohol copolymer having a second ethylene content, the blend resulting in an ethylene content of between 38-44 mol %.

3. The multilayer shrink film of claim 1 wherein the second barrier layer comprises a blend of a first ethylene-vinyl alcohol copolymer having a first ethylene content and a second ethylene-vinyl alcohol copolymer having a second ethylene content, the blend resulting in an ethylene content of between 38-44 mol %.

4. The multilayer shrink film of claim 1 wherein at least a portion of the film is irradiatively cross-linked is at a level of less than 50 kGy.

5. The multilayer shrink film of claim 4 wherein the first barrier layer and the first outer layer are cross-linked and the second barrier layer and the second outer layer are not cross-linked.

6. The multilayer shrink film of claim 1 wherein the multilayer shrink film comprises less than 5 wt % polyamide.

7. The multilayer shrink film of claim 1 wherein an F-25% blend of the multilayer shrink film made in accordance with APR Benchmark Polyethylene (PE) Films and Flexible Packaging Innovation Test Protocol—FILMS1-BG01 has a tensile strength at break measured in accordance with ASTM D822 of no more than 35% delta as compared to an F-0% blend of a control film.

8. The multilayer shrink film of claim 7 wherein the control film is selected from either:
   i. a single component polyolefin, the polyolefin being the polyolefin of the shrink multilayer film which comprises the greatest weight percent in the multilayer shrink film; or
   ii. a blend of all of the polyolefins contained in the multilayer shrink film; the ratio of the blend of all of the polyolefins in the control film is not more than 5% different from the ratio of the blend of polyolefins in the multilayer shrink film, with the ratio of the blend being calculated based on the wt % of the polyethylene copolymers in the multilayer shrink film and by disregarding all non-polyolefins contained in the multilayer shrink film.

9. The multilayer shrink film of claim 1 wherein an F-25% blend of the multilayer shrink film made in accordance with APR Benchmark Polyethylene (PE) Films and Flexible Packaging Innovation Test Protocol—FILMS1-BG01 has an elongation at yield measured in accordance with ASTM D822 of no more than 35% delta as compared to an F-0% blend of a control film.

10. The multilayer shrink film of claim 9 wherein the control film is selected from either:
    i. single component polyolefin, the polyolefin being the polyolefin of the shrink multilayer film which comprises the greatest weight percent in the multilayer shrink film; or
    ii. a blend of all of the polyolefins contained in the multilayer shrink film; the ratio of the blend of all of the polyolefins in the control film is not more than 5% different from the ratio of the blend of polyolefins in the multilayer shrink film, with the ratio of the blend being calculated based on the wt % of the polyethylene copolymers in the multilayer shrink film and by disregarding all non-polyolefins contained in the multilayer shrink film.

11. The multilayer shrink film of claim 1 wherein an P-0% blend of the multilayer shrink film made in accordance with APR Benchmark Polyethylene (PE) Films and Flexible Packaging Innovation Test Protocol—FILMS1-BG01 has a melt flow rate of at least 0.5 g/10 min measured at in accordance with ASTM D1238.

12. The multilayer shrink film of claim 1 wherein the multilayer shrink film is comprises less than 5 wt % of polyvinylidene chloride.

13. The multilayer shrink film of claim 1 where the second outer layer comprises 50-95 wt % polypropylene copolymer and 5-50 wt % polyolefin block copolymer.

14. The multilayer shrink film of claim 7 wherein the control film comprises a blend of at least 30 wt % of at least one very low density polyethylene or blends of very low density polyethylenes and at least 30 wt % of at least one linear low density polyethylene or blends of linear low density polyethylenes.

15. The multilayer shrink film of claim 1 further comprising
   a. a second tie layer disposed between the outer sealant layer and the first barrier layer;
   b. the first tie layer disposed between the first barrier layer and an inner bulk layer;
   c. a third tie layer disposed between the inner bulk layer and the second barrier layer;
   d. a fourth tie layer disposed between the second barrier layer and the second outer layer.

16. The multilayer shrink film of claim 1 wherein the multilayer film has a total polyolefin content of at least 60 wt %.

17. The multilayer shrink film of claim 1 wherein the multilayer film has a residual force in both the longitudinal and traverse directions of at least 70 gf.

18. A packaged product comprising:
    a multilayer shrink film comprising:
    a. a first outer layer being a sealant layer;
    b. a first barrier layer comprising an ethylene-vinyl alcohol copolymer with an ethylene content of between 27-50 mol %;
    c. a second barrier layer comprising an ethylene-vinyl alcohol copolymer with an ethylene content of between 27-50 mol %;
    d. a first tie layer disposed between the first and second barrier layers and directly adhered to at least one of the first or second barrier layer, the tie layer comprising at least one component selected from anhydride modified grafted linear low density polyethylene, anhydride grafted low density polyethylene, anhydride grafted polypropylene, anhydride grafted methyl acrylate copolymer, anhydride grafted butyl acrylate copolymer, homogeneous ethylene/alpha-olefin copolymer, and anhydride grafted ethylene/vinyl acetate copolymer;
    e. a second outer layer being a skin layer;
    wherein one of the first or second barrier layers is cross-linked and one of the first or second barrier layers is not crosslinked;
    the multilayer shrink film having a free shrink of at least 60% at 85° C. measured in accordance with ASTM D2732 an oxygen transmission rate of no more than: 20 cubic centimeters (at standard temperature and pressure) per square meter per day per 1 atmosphere of oxygen pressure differential measured at 0% relative humidity and 23° C. measured according to ASTM D-3985 and a haze after shrink of less than 50% measured in accordance with ASTM D 1003; and
    a product disposed within the multilayer film.

19. The packaged product of claim 18 wherein the multilayer shrink film is a seamless plastic film tubing having a first seal on one end and second seal on a second end; the product is disposed within the multilayer shrink film between the first and second seals and a header or skirt extends away from the product beyond the first and second seals; and the header or skirt has haze after heat treatment of less than 70%.

20. A method making a multilayer shrink film comprising the steps of:
    extruding a multilayer shrink film comprising:
    a. a first outer layer being a sealant layer;
    b. a first barrier layer comprising an ethylene-vinyl alcohol copolymer with an ethylene content of between 27-50 mol %;
    c. a second barrier layer comprising an ethylene-vinyl alcohol copolymer with an ethylene content of between 27-50 mol %;

d. a first tie layer disposed between the first and second barrier layers and directly adhered to at least one of the first or second barrier layer, the tie layer comprising at least one component selected from anhydride modified grafted linear low density polyethylene, anhydride grafted low density polyethylene, anhydride grafted polypropylene, anhydride grafted methyl acrylate copolymer, anhydride grafted butyl acrylate copolymer, homogeneous ethylene/alpha-olefin copolymer, and anhydride grafted ethylene/vinyl acetate copolymer;

e. a second outer layer being a skin layer;

wherein one of the first or second barrier layers is cross-linked and one of the first or second barrier layers is not crosslinked;

the multilayer shrink film having a free shrink of at least 60% at 85° C. measured in accordance with ASTM D2732 an oxygen transmission rate of no more than: 20 cubic centimeters (at standard temperature and pressure) per square meter per day per 1 atmosphere of oxygen pressure differential measured at 0% relative humidity and 23° C. measured according to ASTM D-3985 and a haze after shrink of less than 50% measured in accordance with ASTM D 1003.

* * * * *